(12) United States Patent
Yamaguchi et al.

(10) Patent No.: US 6,407,763 B1
(45) Date of Patent: *Jun. 18, 2002

(54) IMAGE DISPLAY MEDIUM, IMAGE-FORMING METHOD AND IMAGE-FORMING APPARATUS CAPABLE OF REPETITIVE WRITING ON THE IMAGE DISPLAY MEDIUM

(75) Inventors: Yoshiro Yamaguchi; Yoshinori Machida; Kiyoshi Shigehiro; Nobuyuki Nakayama; Shota Oba; Motohiko Sakamaki; Minoru Koshimizu; Takeo Kakinuma, all of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/621,546

(22) Filed: Jul. 21, 2000

(30) Foreign Application Priority Data

Jul. 21, 1999 (JP) .......................... 11-206807
Feb. 23, 2000 (JP) .......................... 2000-046369
Jun. 1, 2000 (JP) .......................... 2000-165138

(51) Int. Cl.[7] .............. B41M 5/00; G02F 1/01
(52) U.S. Cl. .............. 347/112; 345/107; 347/153; 359/296
(58) Field of Search .................. 347/111, 122, 347/151, 153; 430/19, 32, 41; 345/84, 107; 359/290, 296; 399/158, 131

(56) References Cited

U.S. PATENT DOCUMENTS 3,612,758 A * 10/1971 Evans et al. ............ 347/107 X
3,875,576 A * 4/1975 Haas et al. ................ 347/112
6,025,896 A * 2/2000 Hattori et al. ................ 349/86
6,045,955 A * 4/2000 Vincent ........................ 430/45
6,184,856 B1 * 2/2001 Gordon et al. .............. 347/107

OTHER PUBLICATIONS

Kawai, "Development of Microcapsule –type Electrophoretic Display (digital Paper)", The Imaging Society of Japan, Electronic Imaging Seminar, 1999, pp. 31–36.

Jo et al., "New Toner Display Device (I)—Image Display Using Conductive Toner and Charge Transport Layer—", Japan Hardcopy '99 Proceedings, 1999, pp. 249–252.

Jo et al., "New Toner Display Device (II)", Japan Hardcopy '99 Fall Meeting Proceedings, 1999, pp. 10–13.

Kitamura et al., "Toner Display by Electrical Movement of Conductive Toner", The Institute of Image Information and Television Engineers, Technical Report vol. 24, No. 16, 2000, pp. 7–11.

Kawai et al., "Microcapsule—type Electrophoretic Display (MC–EPD)", Japan Hardcopy '99 Proceedings, 1999, pp. 237–240.

* cited by examiner

Primary Examiner—Joan Pendegrass
(74) Attorney, Agent, or Firm—Oliff & Berridge PLC

(57) ABSTRACT

Provided are an image display medium which satisfies, a safety and a high-speed response and which is capable of repetitive rewriting, an image-forming method in which an image can be formed on the image display medium, and an image-forming apparatus. An image display medium is formed by interposing black particles and white particles between a display substrate and a non-display substrate made of a dielectric. A printing electrode first applies an AC voltage to frictionally charge the black and white particles, and then applies a DC voltage adapted to an image between the substrates. The black particles adhered to a portion (non-image portion) to which the voltage of the display substrate is applied are moved to the non-display substrate.

51 Claims, 28 Drawing Sheets

PARTICLE AREA RATE OF DISPLAY
SUBSTRATE SURFACE
(UPPER STAGE: BLACK PARTICLES,
LOWER STAGE: WHITE PARTICLES)

FIG.43

| FIRST PARTICLES | SECOND PARTICLES | CONDUCTIVITY | | | |
|---|---|---|---|---|---|
| | FIRST MEMBER / SECOND MEMBER | CONDUCTIVITY | HOLE-TRANSPORTING PROPERTY | ELECTRON-TRANSPORTING PROPERTY | INSULATING PROPERTY |
| INSULATING PROPERTY | INSULATING PROPERTY | A① | A① | A① | A① |
| | HOLE-TRANSPORTING PROPERTY | B① | B① | B'① | B'① |
| | ELECTRON-TRANSPORTING PROPERTY | B① | B'① | B① | B'① |
| | CONDUCTIVITY | B② | B③ | B③ | B'③ |
| HOLE-TRANSPORTING PROPERTY | HOLE-TRANSPORTING PROPERTY | C'① | C'① | C'① | C'① |
| | ELECTRON-TRANSPORTING PROPERTY | C② | C③ | | C'③ |
| ELECTRON-TRANSPORTING PROPERTY | CONDUCTIVITY | C② | | C③ | C③ |
| CONDUCTIVITY | CONDUCTIVITY | | | | |

| | HOLE-TRANSPORTING PROPERTY | | ELECTRON-TRANSPORTING PROPERTY | | INSULATING PROPERTY |
|---|---|---|---|---|---|
| | HOLE-TRANSPORTING PROPERTY | ELECTRON-TRANSPORTING PROPERTY | ELECTRON-TRANSPORTING PROPERTY | INSULATING PROPERTY | INSULATING PROPERTY |
| HOLE-TRANSPORTING PROPERTY | A① | A① | A① | A① | A① |
| | B① | B'① | B① | B① | A① |
| | A① | B'① | B① | B'① | A① |
| | B① | B② | A① | B'① | A① |
| | B① | C'① | A① | B① | A① |
| | A① | C② | | B① | A① |
| | A① | | | | A① |
| | B① | | | | A① |

IMAGE DISPLAY MEDIUM, IMAGE-FORMING METHOD AND IMAGE-FORMING APPARATUS CAPABLE OF REPETITIVE WRITING ON THE IMAGE DISPLAY MEDIUM

FIELD OF THE INVENTION

The present invention relates to an image display medium, an image-forming method, and an image-forming apparatus. More specifically, it relates to an image display medium capable of repetitive rewriting, an image-forming method in which an image is formed on the image display medium, and an image-forming apparatus.

DESCRIPTION OF THE RELATED ART

As an image display technology capable of repetitive rewriting, which is called electronic paper, technologies such as twisting of color particles (twisting ball display), electrophoresis, a thermal rewritable medium, a liquid crystal having a memory property and electrochromy have been so far known. Of these display technologies, a thermal rewritable medium and a liquid crystal having a memory property are excellent in the image memory property, but no satisfactory white display as in paper can be applied to the display surface. Accordingly, when an image is displayed, an image display portion can hardly be distinguished visually from an image non-display portion. That is, there has been a problem that the image quality is decreased.

Further, the twisting ball display has a display memory property, and oil is present only in cavities around particles inside an image display medium. However, particles are almost solid to conduct sheeting relatively easily. Even when semispherical surfaces colored in white are completely arrayed on the display side, rays entered between gaps of spheres are not reflected, and lost thereinside. Accordingly, white display with 100% coverage is theoretically impossible, and slightly grayish display is provided. Further, since a particle size is required to be smaller than a pixel size, fine particles colored in different tints have to be produced for high-resolution display, and a high-level production technology is needed.

In these technologies, as an image display medium in which an image is displayed with a toner, there is an image display medium in which a conductive color toner and white particles are contained between a display substrate and a non-display substrate that are facing each other using air as a medium to form a charge transfer layer and an electrode within both substrates (Toner Display, Nippon Gazoh Gakkai, Japan Hardcopy '99 *Ronbunshu,* pp. 249–251 and Japan Hardcopy '99 Fall *Yokohshu pp.* 10–13). In such an image display medium, charge is injected into the conductive color toner through the charge transfer layer, and the conductive color toner in which charge has been injected is moved by an electric field between substrates formed according to the image with an electrode, and is adhered to the display substrate. As a result, the image as a contrast between the conductive color toner and the white particles is displayed on the display substrate side.

Further, as an image display medium capable of repetitive rewriting, an image display medium using electrophoresis has been known (Kawai, Development of Electrophoresis Display Using Microcapsules, Nippon Gazoh Gakkai, *Electronic Imaging Kenkyukai,* p. 32, 1999).

However, in the image display technology using the toner, the contrast between black and white is low, and excellent results are not obtained in comparison with other image display technologies. Reporters of this technology presume that a conductive color toner not contacted with a charge transfer layer mounted on an inner surface of an electrode of a non-display substrate and isolated from other conductive color particles is present and charge is not injected in these isolated conductive color particles, so that the particles are not moved by an electric field but randomly remain in the substrates and the contrast is therefore low. Further, a high-speed response is also problematic.

Moreover, since the electrode is employed in the image display medium using the toner, the medium cannot directly be applied to an ordinary image-forming apparatus in which an image is formed by developing an electrostatic latent image formed on an image carrier with a toner and transferring the same onto recording paper, such as a copier or a printer.

Meanwhile, a display technology using electrophoresis or magnetic migration is a technology which provides an image memory property and in which color particles are dispersed in a white liquid. Thus, it is excellent in white display. However, since a white liquid is always incorporated into a gap between color particles in a black display portion, a grayish color is provided to decrease a contrast.

SUMMARY OF THE INVENTION

Under these circumstances, the invention has been made, and provides an image display medium which satisfies a high contrast, a safety and a high-speed response and which is capable of repetitive rewriting, an image-forming method in which an image can be formed on the image display medium, and an image-forming apparatus, and further to provide an image-forming method which can be used in a copier or a printer in which an image is formed on recording paper and an image-forming apparatus at low costs.

The image display medium includes a pair of substrates, and plural types of particle groups contained between the substrates to be movable between the substrates by an electric field applied and which are different in color and charging properties.

According to an aspect of the invention, plural types of particles different in color and charging properties are contained between substrates such that the respective particles are movable between the substrates by the electric field applied. At this time, the plural types of particles have charging properties, and the respective particles are moved according to the strength and the polarity of the electric field applied. As the particles, insulating particles to be charged through frictional charging or conductive particles to be charged by injecting charge through an electrode may be used.

Incidentally, during studies for making the invention, the present inventors have presumed the following with respect to the problems of the display medium using the toner. That is, the image display medium using the toner is so adapted that white particles are treated as a stationary medium unreactive with an electric field and conductive black particles are caused to migrate therein. For this reason, it is only one (conductive black particles) of the two particle groups that can be moved between the substrates. Specifically, white particles can be fixed in nearly stationary state by a structure that the white particles are packed well between the substrates. Nevertheless, in this construction, conductive black particles have to be moved in high-density white particles. Further, the conductive black particles hardly exclude the white particles remaining near the surface of the substrate. Thus, only grayish display is conducted to decrease the contrast.

Moreover, in case of using conductive particles, particles that are not directly contacted with a charge injection electrode have no chance of charge injection unless they are contacted with other charged conductive particles. Thus, such particles cannot be reacted with an electric field. That is, it is presumed that when conductive black particles having good charging properties are used but stationary white particles are present, almost all of conductive black particles cannot be moved and contributed to image display.

In the invention, therefore, the image display medium is so constructed that the particles belonging to the different particle groups can be moved between substrates in mutually opposite directions by the electric field applied. Further, since charging properties of these particles are different depending on the particle group, the moving characteristics by the electric field are also varied.

In case of using insulating particles of reverse polarities, the particles are in the mixed state by the Coulomb force between the substrates just before being contained, and the particles of reverse polarities are separated by applying electric fields stronger than the Coulomb force between these particles, moved in the directions of the electric fields of reverse polarities, and adhered to the surfaces of the substrates. Even when the electric fields are broken, the particles are retained on the substrates by the image force and the van der Waals force. The respective particle groups are accumulated on the respective substrates. In reality, with respect to the applied voltage in the rewriting, an external force stronger than the image force and the van der Waals force can be applied.

In case of using conductive particles, when the particle groups are movable between the substrates, the conductive particles are also moved well, and a rate at which the particles are contacted with each other is increased to increase a rate at which to supply charge to uncharged particles present between the substrates. As a result, the movement of these particles by the electric field can be started.

Particles having the same polarity but different in charging properties and therefore different in the response to the electric field ought to have a high fluidity between particles owing to the same polarity. However, when the particles are packed at high density, these are sometimes agglomerated by the van der Waals force. In the invention, since the particles are contained to be movable between the substrates according to the direction of the electric field, the movement of the particles is smoothly conducted to allow the image display with a good response. In this case, the particles with a large amount of charge are first adhered, and the particles with a small amount of charge are then adhered by increasing the electric field, whereby the color can be changed.

As the other combination, a combination of conductive particles and insulating particles and a combination of two types of conductive particles having different conductive characteristics, namely, a hole type and an electron type, are also available.

In using either of these particle combinations, it is advisable that at least two types of the particle groups have charging properties of different polarities. As stated above, since the two types of the particles have reverse polarities, the respective particles are moved in the reverse electric field directions to provide quite a good response. Moreover, since the particles are clearly separated according to the polarities, the contrast or the sharpness of the image is improved. Especially when white particles and particles of another color which are charged in reverse polarities are used, an image can be displayed as if it is printed on paper.

When the particles of reverse polarities are insulating particles, frictional charging occurs between particles in the movement by the electric field to increase the amount of charge. Accordingly, an effect of improving the image memory property in the absence of the electric field is brought forth.

Incidentally, "movable between the substrates" here referred to means that the particles present on one substrate side can be moved to another substrate side by applying the electric field. It includes not only a case in which the particles of all the particle groups are moved by the electric field at the same time but also a case in which the particles of some particle group are not moved by some strength of the electric field, but can be moved by increasing the strength of the electric field. That is, when the particles are contained in this state, the movement of the particles is substantially not inhibited by the presence of the particles of the other type of the particle group.

Further, for the particles of the various types to be movable between the substrates, any one of, or a combination of, the filling rate of the particles in the substrates, the fluidity between the particles, the form of the particles, the particle diameter, the material of the particles and the substrate inner surface (electrode surface when the particles are directly contacted with the electrode) may be determined. The following are especially preferable.

When the filling rate of all particles contained between the substrates is at least 0.1 vol. % and at most 50 vol. %, the image display is enabled. When it is 40 vol. % or less, especially 25 vol. % or less, the image contrast is good. Thus, it is preferable. When it exceeds 50 vol. %, the particles become abruptly compact to start inhibiting the movement thereof. Thus, a rate of particles remaining on one substrate side is increased to decrease the contrast. When it is at most 50 vol. %, the particles can be moved between the substrates.

The higher fluidity between the particles is preferable. Accordingly, an external form of particles is preferably a curved form, more preferably an elliptic form, further preferably a spherical form. For increasing the fluidity, an external additive to decrease a frictional force may be used.

A particle diameter in which particles can be moved by the electric field applied is available. An average particle diameter is preferably 1 $\mu$m or more. When it is less than 1 $\mu$m, the van der Waals force is greater than the Coulomb force as a binding force between the particles or between the particles and the substrates. Thus, in this state, the particles of reverse polarities are hardly separated by the electric field. However, when particles are adapted to be separated by combination with a force other than the electric field, such as a force of ultrasonic vibration, particles having a particle diameter of less than 1 $\mu$m can sometimes be used. Especially, when a high image memory property is required, it is advisable to make the particle diameter less than 1 $\mu$m. When a rewriting device is simplified or rewriting is conducted at high speed, it is advisable to employ a particle diameter of 1 $\mu$m or more.

With respect to a combination of the particles and the substrate materials or the portions in contact with the particles, such as the electrode, it is advisable to select a combination which decreases the adhesion therebetween because the particles can easily be moved between the substrates. Thus, it is preferable in the rewriting at high speed. The surface of the substrate may be a flat surface or a scattered surface (especially an observation surface of the substrate on the reverse side).

It is also possible that a transparent insulating solvent is poured between the substrates to move two or more color particles electrophoretically. This is because the image contrast can be increased in comparison with the electrophoresis of color particles in an ordinary white insulating liquid.

However, since the movement of the particles is inhibited by the viscosity of the solvent, the high-speed response is decreased, and the color of the color particles on the reverse side is sometimes faded by refraction and scattering of the incident light due to the solvent. Accordingly, in consideration of the ease of handling in vacuum, in use or in production, it is most preferable that the various particle groups are contained in a gas such as air.

As a method of charging the particles, the particles can be charged by the electric field after being contained, or the plural types of the particle groups can previously be charged by mixing and then contained between the substrates. Further, in case of the insulating particles, it is also possible that after the particles are contained, the display medium itself is shaken to stir and frictionally charge the particles, whereby the particles are charged in reverse polarities.

The average amount of charge (femto Coulombs, hereinafter referred to as fC per particle) of the particles is approximately in proportion to a square of the average particle diameter 2r of the particles. The smaller the average particle diameter, the smaller the average amount (fC per particle) of charge. It is thus found that the preferable range of the average amount of charge varies depending on the particle diameter. That is, the average amount of charge of each particle is preferably at least $\pm 5 \times (r^2/10^2)$ fC per particle and at most $\pm 150 \times (r^2/10^2)$ fC per particle. When it is smaller than $\pm 5 \times (r^2/10^2)$ fC per particle, particles are separated, and moved between the substrates in the different directions, but no satisfactory display density is shown. Further, when it is larger than $\pm 150 \times (r^2/10^2)$ fC per particle, the particles are not separated, and these are formed into an agglomerate, and moved in the same direction to decrease the contrast of the display density. The charging properties of the particles can be controlled by the material constituting the particles, the external and internal additives added to the particles, the layer structure of the particles and the form of the particles.

According to another aspect of the invention, an additive is incorporated in the surfaces of the particles of at least one type of the particle groups, and the additive contains a titanium compound obtained by the reaction of TiO (OH)$_2$ and a silane compound, whereby an appropriate amount of charge, a stable charge retention and a good fluidity are imparted to the particle groups. Consequently, the particles can smoothly be moved stably between the substrates by the electric field applied therebetween without strongly adhering the particles to the inside surfaces of the substrates, and the image display is enabled with a high contrast.

As a result, the electric field is applied according to the image to move the particle groups according to the image, and the image can be displayed by the contrast of colors of the particle groups. Further, even when the electric field is lost, the particle groups moved onto the substrates can remain there by the image force and the adhesion to retain the image. After the lapse of time, the electric field is applied again, and the particles group can then be moved again. In this manner, the image can be displayed repetitively by applying the electric field from outside according to the image. By the way, at least two types are sufficient as colors of the particle groups. The charge-transporting property may be imparted to the particle groups. Further, an insulating material such as a dielectric, a conductive material and a charge-transferring material can be used in the pair of substrates. A combination of particles having a contrast, namely, capable of image display and substrates is shown in a table in FIG. 43.

In the table, a blank indicates a combination having no contrast, namely, incapable of image display.

The symbols in the table are described below. A, B and C refer to a process for charging particles.

A: First and second particles are moved according to the electric field between members by being reversely charged in advance through frictional charging, and are adhered to the opposite members to give a contrast.

B: First or second particles are moved by the electric field between the members by being charged through injecting charge therein from the substrate. The other particles are moved according to the electric field between the members by being charged by the friction through the movement of the former particles or the previous friction through stirring or vibration.

C: Both the first and second particles are moved according to the electric field between the members by being charged through injection of charge from the substrate.

Further, a prime (', B' or C') allotted to B or C indicates from which member charge is injected in particles.

B or C without a prime indicates that charge is injected in the particles from both of the first and second members.

B' or C' indicates that charge is injected in the particles from one of the members.

Further, figures encircled indicate with what behavior the particles have a contrast when the electric field is applied between the members.

A: The first and second particles have a contrast by being adhered to opposite members.

B: Conductive particles in which charge is injected by the members are moved between the members by being charged through injection of charge from both the members. As soon as the electric field is lost, the particles are adhered to the members, so that half of the particles are adhered to each of the members. However, since charge is injected in the other particles from one member, the particles are adhered to one member by the electric field to give a contrast.

X: The conductive particles are always adhered to the same member regardless of the polarity of the electric field. The other particles are moved according to the polarity of the electric field between the members. Consequently, a contrast is given according to the amounts of the other particles adhered.

With respect to the particles having the hole-transporting property, the electron-transporting property and the conductivity in the blank of the table, when the frictional charging occurs by the mixing and stirring of the first and second particles to charge the same in opposite polarities and the charges of both the particles are neutralized through injection of charge received from the substrate or through contact between both the particles or the particles are not charged in the same polarity, this does not apply, and a contrast is given.

According to another aspect of the invention, the particles can be moved with a magnetic force by using magnetic particles in at least one of the particle groups.

Further, spacer particles having a larger particle diameter than these particles may be contained between the substrates. As a result, a distance between the substrates can be maintained approximately constant.

According to another aspect of the invention, the substrates have a cell structure partitioned in a predetermined shape, whereby the distance between the substrates can be maintained approximately constant and partial imbalance of the particles contained between the substrates can be controlled to allow more stabler image display.

According to another aspect of the invention, the particle groups may be encapsulated in cells according to plural colors forming a multicolor image. For example, yellow particles and white particles, magenta particles and white particles, and cyan particles and white particles are encapsulated in the respective cells. The color image can be formed by generating the electric field according to each color.

According to another aspect of the invention, there is provided an image-forming apparatus in which the image is formed on the image display medium, the image-forming apparatus having an electric field-generating unit for generating an electric field adapted to the image between the pair of substrates.

In this case, the electric field-generating unit generates the electric field adapted to the image between the pair of substrates, whereby charged particle particles between the substrates which are previously charged or remain charged after the image formation is once conducted can be moved according to the image. Further, according to another aspect of the invention, when the matrix electrodes are formed on the pair of substrates, the electric field adapted to the image can be generated by applying a voltage adapted to the image to the matrix electrodes.

For example, it is possible that a pair of stripe electrodes are crossed to provide an electrode arrangement by a so-called simple matrix structure and the electric field is thus applied between the substrates to move the particles. Plural stripe electrodes may be placed on the substrates or held inside the substrates. This simple matrix structure can reduce production costs because the electrode structure is simple and the production is easy.

Further, according to another aspect of the invention, when a pixel electrode is formed on one of the pair of substrates and an electrode is formed on another substrate, the electric field adapted to the image can be generated by applying a voltage adapted to the image to the pixel electrode.

The electric field-generating unit may be an ion-generating unit or a stylus electrode.

According to another aspect of the invention, there is provided an image-forming apparatus for forming an image on an image display medium in which a photoconductive layer is formed on one of the pair of substrates, the image-forming apparatus having electrodes for applying a voltage between the pair of substrates, a transparent panel formed in a pattern adapted to the image and a light source for applying light to the transparent panel.

In this case, the voltage-applying unit applies the voltage between the pair of substrates. For example, an image display medium in which a photoconductive layer is formed on one of the pair of substrates or an image display medium in which at least one of the particle groups contains a photoconductive material is held between substrates having electrodes, and, for example, a DC voltage is applied thereto. A transparent panel formed in a pattern adapted to the image is attached to the substrate on which the photoconductive layer is formed, and this transparent panel is irradiated with light or exposed to light from the light source. The photoconductive layer here acts as a dielectric layer in an unexposed state, and as a conductive layer in an exposed state. Accordingly, in the exposed state, the particle groups between the substrates are moved according to the image by the voltage applied by the voltage-applying unit to form the image.

According to another aspect of the invention, there is provided an image-forming apparatus for forming an image on an image display medium, the image-forming apparatus having a latent image carrier, an electrostatic latent image-forming unit for forming an electrostatic latent image adapted to the image on the latent image carrier, and a counter electrode for generating an electric field between it and the latent image carrier, the counter electrode being mounted in a position facing the latent image carrier such that the image display medium can be positioned therebetween.

In this case, the electrostatic latent image-forming unit forms the electrostatic latent image adapted to the image on the latent image carrier. The counter electrode is mounted facing the latent image carrier such that the image display medium can be positioned therebetween. That is, the electric field can be generated between the electrostatic latent image on the electrostatic latent image carrier and the counter electrode. Consequently, the particle groups contained between the substrates can be moved according to the image by the electric field generated to form the image on the image display medium. When the electrostatic latent image for each color is formed on the latent image carrier and the foregoing image display medium is used, the color image can also be formed.

The electrostatic latent image-forming unit may be so adapted that the latent image carrier having a photoreceptive layer and uniformly charged may be scanned with light beam adapted to the image to form the latent image adapted to the image on the latent image carrier. Further, the latent image carrier may be irradiated with ions generated by the ion-generating unit to form the electrostatic latent image adapted to the image on the latent image carrier. Still further, the electrostatic latent image adapted to the image may be formed on the latent image carrier by applying a high voltage to the stylus electrode to generate charge adapted to the image.

According to another aspect of the invention, a bias voltage is applied to the counter electrode, whereby an electric field can be generated in the opposite direction between the latent image carrier and the counter electrode. Therefore, for example, the particles adhered to the substrate on the counter electrode side can be moved to the substrate on the latent image carrier side, and the particles adhered to the substrate on the latent image carrier side to the substrate on the counter electrode side respectively.

According to another aspect of the invention, the image-forming apparatus has further an inputting unit for inputting whether the medium on which the image is formed is the image display medium or an image-recording medium, a developing unit for developing the electrostatic latent image formed by the electrostatic latent image-forming unit with a toner when the result inputted by the inputting unit is the image-recording medium, a transferring unit for transferring the toner image developed by the developing unit onto the image-recording medium, and a fixing unit for fixing the toner image transferred onto the image-recording medium.

In this case, the inputting unit is for inputting whether the medium on which the image is formed is the image display medium or the image-recording medium, namely, ordinary recording paper. For example, a keyboard or a mouse can be used. Users can select the medium by this inputting unit. Further, the inputting unit may be a medium-detecting unit for detecting whether the medium on which the image is formed is the image display medium or the image-recording medium. In this instance, it is possible to detect which the medium is from an amount of reflected light by irradiating the medium with light. Moreover, it is also possible to detect which the medium is by detecting the weight.

In the developing unit, the electrostatic latent image formed by the electrostatic latent image-forming unit is developed with the toner when the result inputted by the inputting unit is the image-recording medium, namely, ordinary recording paper. In the transferring unit, the toner image developed with the developing unit is transferred by applying, for example, a voltage to the image-recording medium. In the fixing unit, the toner image transferred onto the image-recording medium is fixed through, for example, heat fixing or pressure fixing.

Further, the transferring unit may be a counter electrode. That is, the image formation of the image display medium and the image formation of the image-recording medium can be conducted with the same transferring unit, whereby the apparatus can be simplified and the costs be reduced.

When the medium is the image display medium, the fixing treatment is dispensed with. Thus, according to another aspect of the invention, it is also possible that when the result inputted by the inputting unit is the image display medium, the fixing treatment by the fixing unit is not conducted. Consequently, the deterioration of the image display medium owing to heat can be prevented.

According to another aspect of the invention, the apparatus has further a development stopping unit for stopping the development by the developing unit when the result inputted by the inputting unit is the image display medium.

In this case, the development stopping unit stops the development when the result inputted by the inputting unit is the image display medium because there is no need to operate the developing unit. Further, when the developing unit is in an operable state, the toner on the electrostatic latent image carrier is supplied, and the image display medium is sometimes contaminated with the toner. Accordingly, when the development with the developing unit is stopped, the adhesion of the toner to the image display medium can be prevented.

In the development-stopping unit, the developing unit may be spaced apart from the latent image carrier, whereby the supply of the toner to the electrostatic latent image carrier can be prevented. Further, the rotation of the toner carrier included in the developing unit may be stopped. Still further, a voltage of reverse polarity to the potential of the electrostatic latent image may be applied to the toner carrier included in the developing unit. Furthermore, the supply of the toner to the toner carrier included in the developing unit may be stopped.

According to another aspect of the invention, the apparatus has further a charging unit for preliminarily charging the particle groups.

In this case, the particles can satisfactorily be moved by preliminarily charging the particle groups with the charging unit to display the image stably.

In the charging unit, at least one of a DC voltage and an AC voltage is applied to the substrates. When the DC voltage is applied to the substrates, the particle groups can uniformly be adhered to one of the substrates. Thus, there is no need to apply bias to the counter electrode. Further, when the AC voltage is applied, the particle groups can satisfactorily be charged. Still further, the charging unit may be a vibration unit for vibrating the substrates. Furthermore, when the image display medium in which at least one of the particle groups is magnetic is preliminarily charged, the charging unit may apply an alternating magnetic field to the substrates.

According to another aspect of the invention, there is provided an image-forming method which includes applying an alternating field to plural types of particle groups of an image display medium contained between substrates to be movable between the substrates by an electric field applied and which are different in color and charging properties just before an electric field adapted to an image information is applied, at least two types of the particle groups being different from each other in charging properties. Consequently, since the particles are forcibly vibrated between the substrates just before the image display, the particles adhered to the surfaces of the substrates are peeled off to expedite the movement of the particles adapted to the image.

According to another aspect of the invention, the alternating field is applied to the whole surface of the image display medium at the same time just before applying an electric field adapted to the image information, whereby the particles in the substrates can be moved for a short period of time. This is effective for moving the particles by applying the electric field between the substrates using an electrode of a character or a pattern or for moving the particles by applying the electric field between the substrates using an electrode of a matrix structure.

According to another aspect of the invention, the alternating field is applied just before applying the electric field adapted to the image information according to a sequence for applying an electric field of a line unit with a matrix electrode, whereby the particles are forcibly vibrated on the whole surface just before the image display without applying a new sequence or wiring for sending a signal of whole surface simultaneous driving. Accordingly, the movement of particles adapted to the image can be expedited with only a device required for the image display without providing an additional special device.

According to another aspect of the invention, the amplitude of the alternating field is reduced with the lapse of time, whereby the increase in the moving rate accompanied by the increase in the amount of charge due to the frictional charging of the particles is prevented, and the movement rate of the particles reciprocated is gradually reduced to zero to decrease the adhesion between the particles or between the particles and the substrates. Consequently, the particles can easily be moved according to the electric field.

According to another aspect of the invention, the voltage waveform of the alternating field is rectangular. As a result, a force to act on the particles by the electric field for a unit time is increased to increase the response to the electric field. Thus, the particles can be moved to the opposite surface for a shorter period of time.

BRIEF DESCRIPTION OF THE DRAWINGS

Preferred embodiments of the invention will be described in detail based on the following figures, wherein:

FIG. 43 is a table showing a combination of particles capable of image display and substrates;

DESCRIPTION OF THE PREFERRED EMBODIMENTS

First Embodiment

Figure 1:
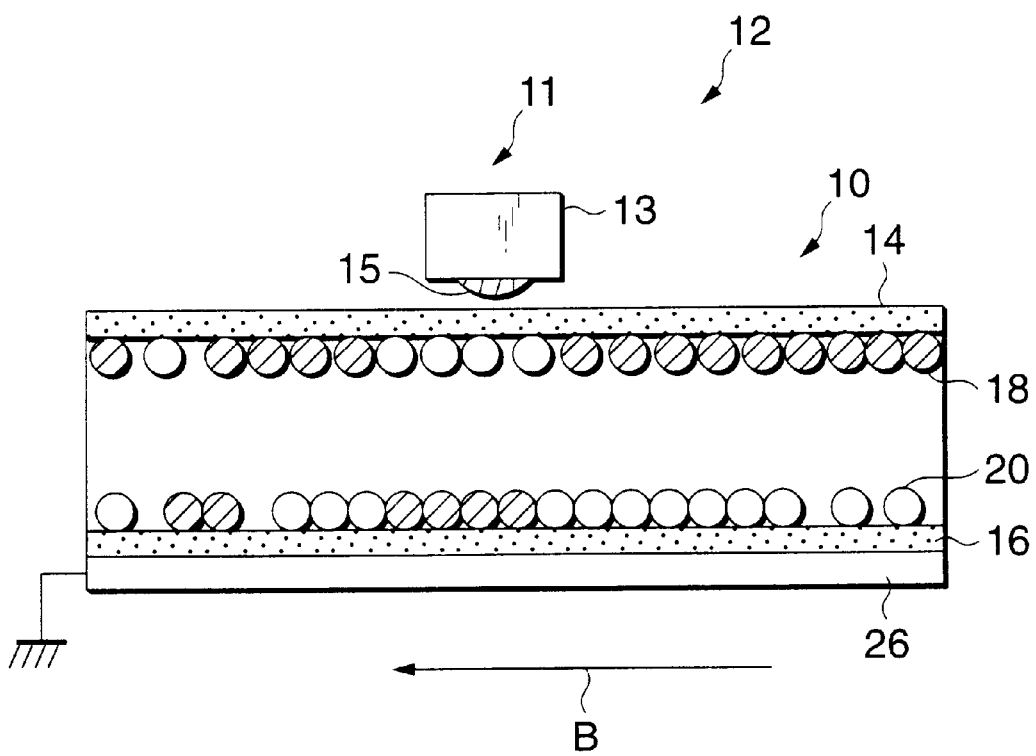
FIG. 1 is a schematic view of an image-forming apparatus according to the fourth embodiment.

The first embodiment of the invention is described in detail below by referring to the drawings.

FIG. 1 shows an image display medium and an image-forming apparatus for forming an image on the image display medium according to this embodiment.

Figure 30:
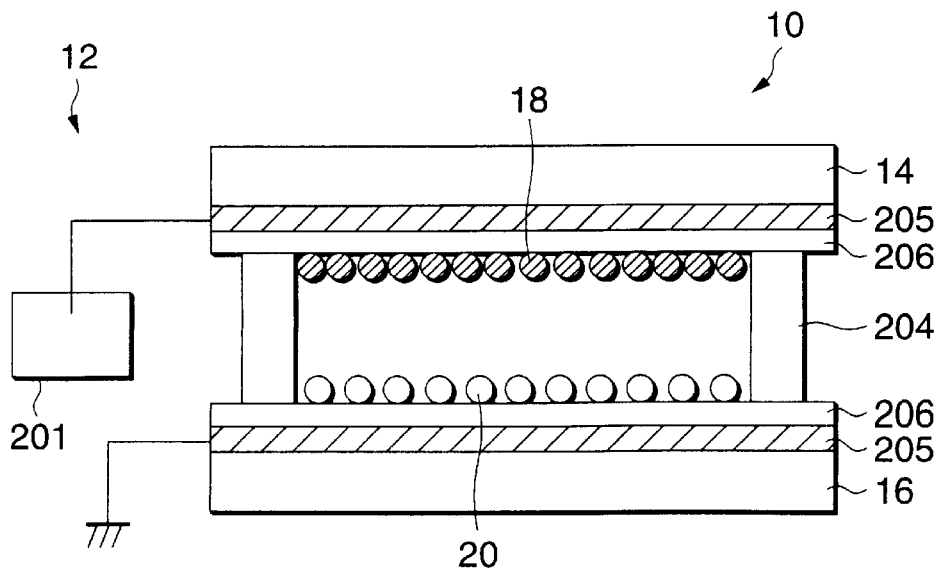
FIG. 30 is a schematic view of an image-forming apparatus according to the first embodiment.

An image-forming apparatus 12 according to the first embodiment has, as shown in FIG. 30, a voltage-applying unit 201. The image display medium 10 is so adapted that a spacer 204, black particles 18 and white particles 20 are contained between a display substrate 14 on the side of image display and a non-display substrate 16 facing the display substrate 14. The display substrate 14 and the non-display substrate 16 are provided with transparent electrodes 205 as will be later described. The transparent electrode 205 of the display substrate 14 is earthed, and the transparent electrode 205 of the non-display substrate 16 is connected to the voltage-applying unit 201.

The image display medium 10 is described in detail below. For example, a 7059 glass substrate with a transparent electrode ITO having a size of 50×50×1.1 mm is used in the display substrate 14 and the non-display substrate 16 constituting the outside of the image display medium 10. An inner surface 206 in contact with the particles of the glass substrate is coated with a polycarbonate resin (PC-Z) to a thickness of 5 μm. A central portion of a silicone rubber plate 204 having a size of 40×40×0.3 mm is cut out to a square of 15×15 mm to form a space, and this silicone rubber plate is mounted on the non-display substrate 16. Spherical fine particles (obtained by classifying Tech-Polymer MBX-20-White made by Sekisui Chemical Co., Ltd.) of titanium oxide-containing crosslinked polymethyl methacrylate containing a fine powder of titania treated with isopropyltri-methoxysilane at a weight ratio of 100 to 0.4 and having a volume average particle diameter of 20 μm and spherical fine particles (obtained by classifying Tech-Polymer MBX-20-Black made by Sekisui Chemical Co., Ltd.) of carbon-containing crosslinked polymethyl methacrylate having a volume average particle diameter of 20 μm are mixed at a weight ratio of 2:1. Approximately 15 mg of the mixed particles are sifted out on the square space cut in the silicone rubber plate through a screen. Subsequently, the display substrate 202 is closely adhered to the silicone rubber plate, and the two substrates are held with a double clip under pressure to closely adhere the silicone rubber plate to the two substrates and form the image display medium 10.

Figure 31:
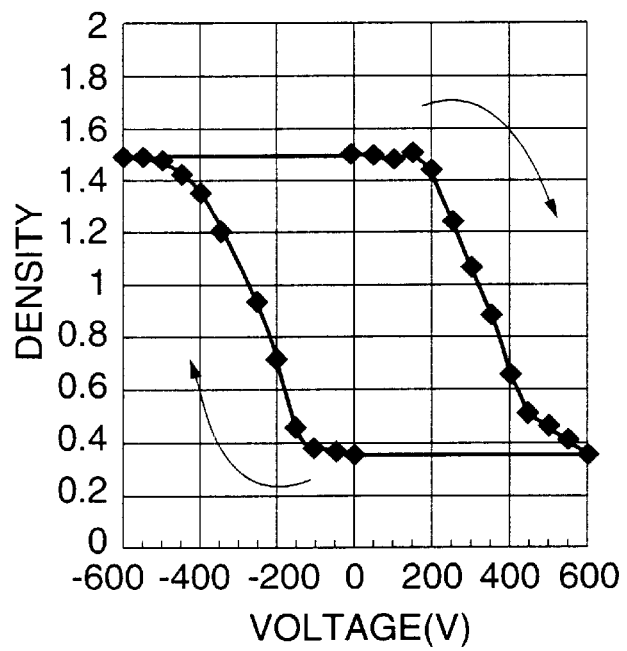
FIG. 31 is a graph showing a relation of a driving voltage and a display density according to the first embodiment.

The driving condition of the image display medium 10 is described by referring to FIG. 31. When a DC voltage of 200

V is applied to the transparent electrode of the display substrate 14, a part of negatively charged white particles present on the non-display substrate 16 are moved toward the display substrate 14 by the action of the electric field. When a DC voltage of 500 V or more is applied thereto, many of the white particles are moved to the display substrate 14 to saturate the display density almost completely. At this time, positively charged black particles are moved toward the non-display substrate 16. Even when the voltage is zero in this case, the particles on the display substrate are not moved, and the display density remains unchanged.

Next, even when a DC voltage of −100 V is applied to the transparent electrode of the display substrate 14, the particles are not moved. When a DC voltage of −200 V is applied to the transparent electrode of the display substrate 14, a part of the positively charged black particles present on the non-display substrate 16 are moved toward the display substrate 14 by the action of the electric field. Further, when a DC voltage of −500 V or over is applied thereto, many of the black particles are moved toward the display substrate 14 to satisfy the display density almost completely. At this time, the negatively charged white particles are moved toward the non-display substrate 16. Even when the voltage is zero in this case, the particles on the display substrate are not moved, and the display density remains unchanged.

As stated above, there is an insensitive zone in which the particles are not moved relative to the intensity of the applied voltage. Thus, a threshold value of the voltage to the movement of particles exists. This property is suited for simple matrix driving.

The function of the first embodiment is described below.

The white particles 20 containing the titania fine powder treated with isopropyltrimethoxysilane are charged at appropriate negative polarity by the frictional charging of the black particles 18 and a substrate inner surface 206. The average amount of charge of the white particles 20 is −16 fC, and the average amount of charge of the black particles 18 is +16 fC. At this time, the substrate inner surface is made of a polycarbonate resin (PC-Z). Since the material of the substrate inner surface 206 has a great effect on the charge polarity of the particles, it has to be selected as required. The silane-treated titania fine powder functions to control the charging properties of the particles to an appropriate level which is not too high and to maintain the fluidity of the particles at a high level.

The amount of the titanium compound is adjusted, as required, in consideration of the particle diameter of the particles and the particle diameter of the fine powder. When the amount of the titanium compound is too large, the fine powder isolated from the surfaces of the white particles is generated, and this is adhered to the surfaces of a part of the black particles 18 to give the black particles 18 and the white particles 20 the same charge polarity. Consequently, the particles are moved in the same direction relative to the electric field. Thus, it is undesirous. The amount of the titanium compound varies depending on the particle diameter of the particles. It is between 0.05 and 1.0 part by weight, preferably between 0.1 and 0.5 part by weight per 100 parts by weight of the particles.

It is advisable that the fine powder is added to either the white particles 20 or the black particles 18. When fine powders different in polarity are externally added to plural types of the particles, free fine powders different in polarity tend to be strongly agglomerated to form an agglomerate of particles which is not moved by the electric field to deteriorate the image quality. When the fine powder is added to two or more types of the particles, it is advisable that the fine powder is stricken into the surfaces of the particles by an impulse force or the surfaces of the particles are heated to firmly fix the fine particles on the surfaces of the particles for which formation of free fine powder does not occur.

Since the particles used in this embodiment take a spherical form, the contact between the particles is approximately a point contact, and the contact between the particles and the substrate inner surface is approximately a point contact. Thus, the adhesion between the particles and between the particles and the substrate inner surface 206 based on the van der Waals force is small. Accordingly, even when the substrate inner surface 206 is a dielectric, the charged particles can smoothly be moved within the substrates by the electric field.

Figure 32:
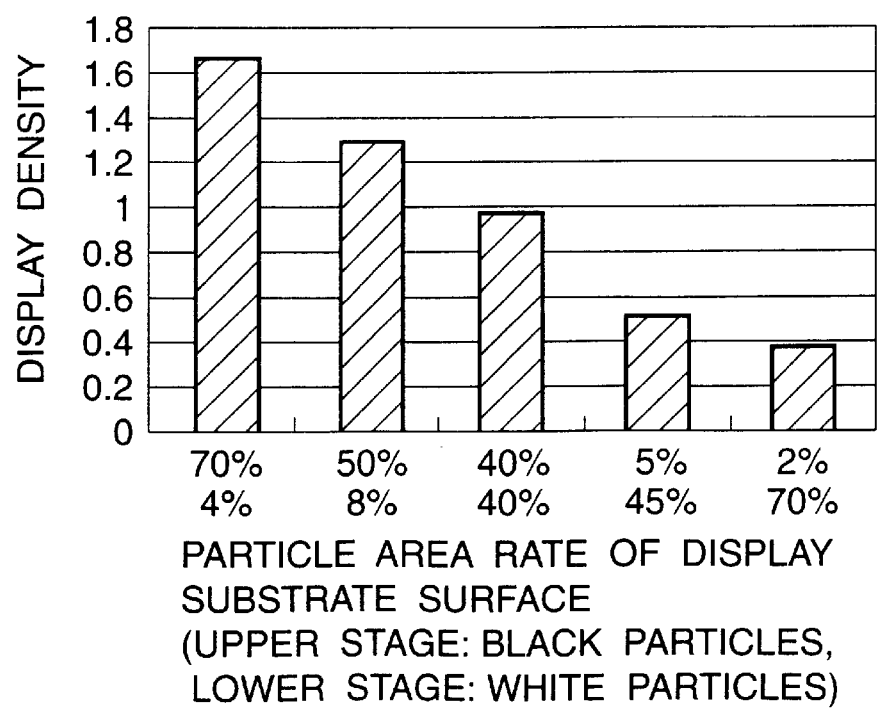
FIG. 32 is a graph showing a relation of a particle area rate and a display density according to the first embodiment.

Since the particles containing titanium oxide, one of the inorganic pigments having a high hiding power are used, the white particles 20 which cover approximately the whole of the substrate inner surface 206 at an area rate of 70% can give a high white density. FIG. 32 shows a relation of the area rate of the white particles 20, the area rate of the black particles 18 and the display density. At this time, the mixing ratio of the white particles 20 and the black particles 18 is 2:1. Approximately the whole surface is covered at the area rate of 70%, which is close to the saturated density.

The adhesion between the particles and the agglomeration of the particles are avoided by making the particle diameters of the white particles 20 and the black particles 18 approximately the same. Thus, the high white density and the high black density are provided. When the particle diameter of one particle group is small, the particles are adhered around the large particles to decrease the inherent color density. Further, the contrast also varies depending on the mixing ratio of the black and white particles. The mixing ratio close to the mixing ratio at which the surface areas of the two types of the particles are equal is desirable. When the mixing ratio is much deviated from this, the color of the particles at a high ratio is dominated. However, this does not apply when it is required to give a contrast with a dark tone and a light tone of the same color or to display a color formed by mixing two types of color particles.

The other materials are listed below. As the fine powder mixed with the particles, silicon oxide (silica) and titanium oxide are known. These are modified by reacting the same with a silane compound, a silane coupling agent or silicone oil and drying the reaction product, and a positive or negative charging property, a fluidity and an environmental dependence are adjusted. Hydrophobic silica or hydrophobic titanium oxide which is well known can be used. Especially, a titanium compound obtained by the reaction of $TiO(OH)_2$ and a silane coupling agent as described in Japanese Patent Laid-Open No. 3177/1998 is suitable. This titanium compound is produced by reacting $TiO(OH)_2$ formed in a wet step with a silane compound or silicone oil and drying the reaction product. Since a calcination step at hundreds of degrees centigrade is not conducted, strong bonding of Ti's is not provided, and the particles are approximately in the primary particle state without agglomeration. Further, since $TiO(OH)_2$ is directly reacted with the silane compound or the silicone oil, the treatment amount can be increased, and the charging can be controlled by varying the treatment amount of the silane compound. Further, the charging properties that can be imparted are greatly improved in comparison with ordinary titanium oxide.

Examples of the silane compound here can include chlorosilane, alkoxysilane, silazane and a special silylation agent. Examples of the silicone oil include dimethylsilicone oil, alkyl-modified silicone oil, α-methylsulfone-modified silicone oil, chlorophenylsilicone oil, fluorine-modified silicone oil and amino-modified silicone oil. Examples of the white particles 20 include the spherical fine particles (MBX-White made by Sekisui Chemical Co., Ltd.) of titanium oxide-containing crosslinked polymethyl methacrylate, spherical fine particles (Chemisnow-MX made by Soken Chemical Co., Ltd.) of crosslinked polymethyl methacrylate containing a titanium oxide pigment fine powder, a product obtained by striking a white pigment fine powder into the spherical fine particles with an impulse force to fix the same in the surfaces of the fine particles, and particles obtained by adhering or embedding a white pigment fine powder to or in surfaces of mother particles made of various materials such as a styrene resin, a phenolic resin, a silicone resin and a glass. The spherical fine particles (Chemisnow-MX made by Soken Chemical Co., Ltd.) of crosslinked polymethyl methacrylate are monodisperse and have a uniform particle diameter. The charging properties of particles are uniform, the threshold value in the particle movement to the electric field is sharper, and a high contrast is obtained. Examples of the white pigment include titanium oxide, magnesium oxide and zinc oxide. Examples of the white particles include porous sponge particles and hollow particles including air therein. Further, a toner used in a copier or a printer, especially spherical particles formed by a wet method such as a polymerization method or a suspension method are also available.

Examples of the black particles 18 include the spherical fine particles (MBX-Black made by Sekisui Chemical Co., Ltd.) of crosslinked polymethyl methacrylate, spherical particles (Micropearl BB and Micropearl BBP made by Sekisui Chemical Co. Ltd.) formed of a crosslinked copolymer containing divinylbenzene as a main component, amorphous carbon fine particles prepared by calcining phenol resin particles (Univeks GCP made by Unitika Ltd.) and carbon and graphite spherical fine particles (Nika-Bead ICB, Nika-Bead MC and Nika-Bead PC made by Nippon Carbon K.K.). Further, besides the black and white particles, color particles such as red, blue, green, magenta, cyan, yellow, gold and silver particles are also available. Examples thereof include spherical fine particles (MBX-Red made by Sekisui Chemical Co., Ltd.) of crosslinked polymethyl methacrylate, and spherical conductive particles (Micropearl AU made by Sekisui Chemical Co. Ltd.) obtained by applying electroless nickel plating and then gold substitution plating to surfaces of fine particles formed of a crosslinked copolymer containing divinylbenzene as a main component. Still further, a toner used in a copier or a printer, especially spherical particles formed by a wet method such as a polymerization method or a suspension method are also available.

For example, magenta spherical particles are prepared as follows. One hundred parts by weight of a polyester resin, 4 parts by weight of C. I. Pigment Red 57 and 110 parts by weight of ethyl acetate are dispersed with a ball mill for 48 hours to form solution A. Meanwhile, 100 parts by weight of a carboxymethylcellulose 2% aqueous solution is prepared as solution B. Subsequently, 100 parts by weight of solution B is stirred with an emulsifier, and 50 parts by weight of solution A is slowly charged therein to form a suspension. Then, ethyl acetate is removed under reduced pressure, and the residue is washed with water, dried, and classified to obtain magenta particles. The average particle diameter of the particles is 7 $\mu$m. The red particles and the white particles are mixed at a weight ratio of 1:5, and contained between the substrates. An electric field is applied to provide display with a contrast of red and white.

In this manner, the particle groups excellent in charging properties, fluidity and environmental stability are obtained. The electric field is applied between the substrates with the particle groups contained to move the particle groups, whereby the high black density and the high white density are obtained and the display with the high contrast can be provided.

EXAMPLE 1

An example of the first embodiment is described.

With respect to the image display medium 10 of the first embodiment, the dependence of the moving properties of the white particles 20 and the black particles 18 between the substrates on the filling amount and the filling rate was tested, and the results shown in Table 1 were obtained. The average particle diameter of the black particles 18 was 20 $\mu$m, and the average particle diameter of the white particles 20 was 20 $\mu$m. The mixing ratio of the black particles 18 and the white particles 20 was 1:2 (weight ratio). At this time, the true specific gravity of the black particles 18 was 1.23, and the true specific gravity of the white particles 20 was 1.85. Further, the filling rate was indicated in terms of (total volume of particles/volume of gap between substrates).

TABLE 1

| | Gap between substrates (mm) | Filling rate (vol. %) | Filling amount (mg/cm$^2$) | Black density | White density |
| --- | --- | --- | --- | --- | --- |
| Ex. 1 | 0.3 | 52 | 24.9 | Particles are not moved. | Particles are not moved. |
| Ex. 2 | 0.3 | 42 | 20.1 | Part of particles are moved. | Part of particles are moved. |
| Ex. 3 | 0.3 | 22 | 10.5 | 1.5–1.6 | 0.35–0.4 |
| Ex. 4 | 0.3 | 16 | 7.7 | 1.5–1.6 | 0.35–0.4 |
| Ex. 5 | 0.3 | 14 | 6.7 | 1.5–1.6 | 0.35–0.4 |
| Ex. 6 | 0.3 | 8 | 3.8 | 1.5–1.6 | 0.35–0.4 |
| Ex. 7 | 0.3 | 6 | 2.9 | 1.2–1.3 | 0.4–0.5 |
| Ex. 8 | 0.1 | 42 | 6.7 | Part of particles are moved. | Part of particles are moved. |
| Ex. 9 | 0.1 | 24 | 3.8 | 1.4–1.5 | 0.45–0.55 |

TABLE 1-continued

| | Gap between substrates (mm) | Filling rate (vol. %) | Filling amount (mg/cm$^2$) | Black density | White density |
|---|---|---|---|---|---|
| Ex. 10 | 1.0 | 3 | 4.8 | 1.5–1.6 | 0.35–0.4 |
| Ex. 11 | 5.0 | 1 | 8.0 | 1.5–1.6 | 0.35–0.4 |
| Ex. 12 | 15 | 0.12 | 2.9 | 1.2–1.3 | 0.35–0.45 |

From the results in Table 1, it is found that when the particles of the particle groups are contained such that the filling rate of the particles is 50 vol. % or less, they are movable between the substrates, and further that when the filling rate is 40 vol. % or less, the particles can be moved to such an extent that the image contrast can be given and especially when the filling rate is 25 vol. % or less, the particles are easily moved.

Figure 41:
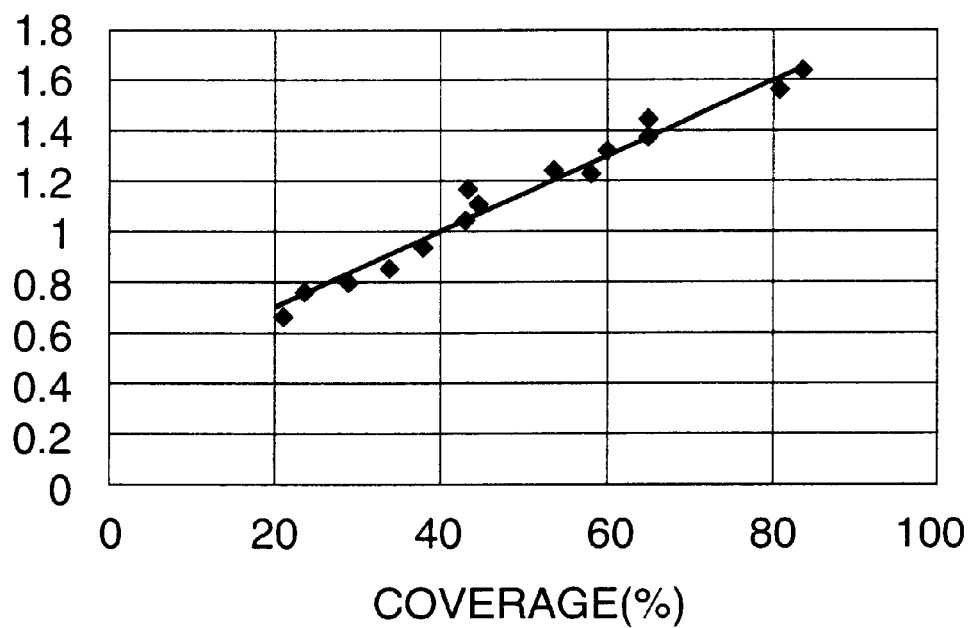
FIG. 41 is a graph showing a relation of a filling rate and a filling amount.
Figure 42:
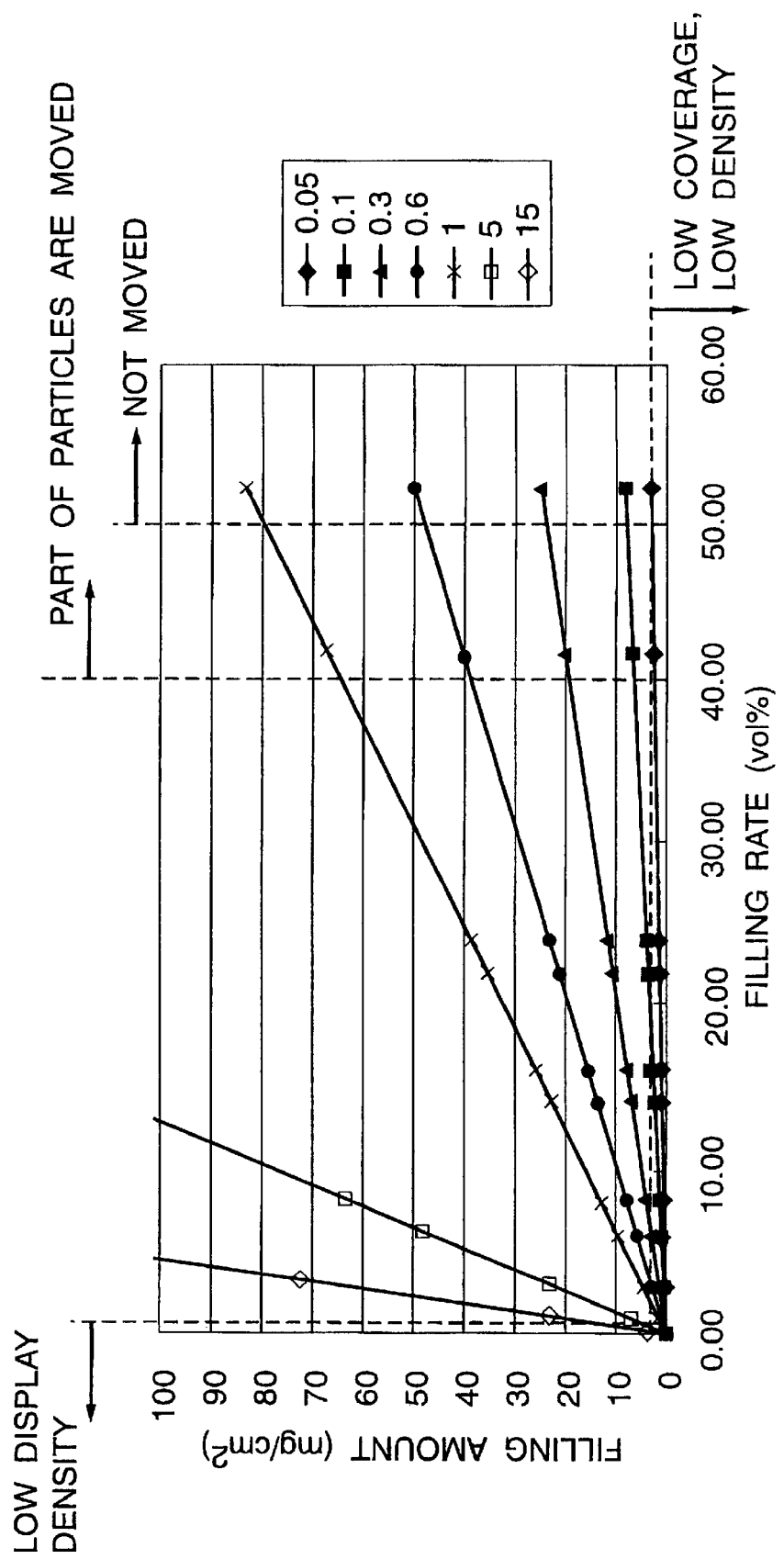
FIG. 42 is a view showing a relation of a projected area rate and a display density of black particles.

Further, when the filling amount is less than 3 mg/cm$^2$, the black density is 1.2, and slightly low as shown in Example 7. When the filling amount is 3.8 mg/cm$^2$ or more, as shown in FIG. 41, the projected area rate of the particles adhered to the display substrate surface is 70% or more, approximately one particle layer is formed on the inner surface of the substrate, and a satisfactory black density (1.4 or more) is provided. A preferable filling amount is between 6 and 12 mg/cm$^2$. Accordingly, in view of the density, the filling amount has to be approximately 3 mg/cm$^2$ or more. As shown in FIG. 42, when the gap between the substrates is enlarged, a satisfactory density can be obtained even at a lower filling rate. Thus, the lower limit of the filling rate depends on the size of the gap between the substrates. When the gap between the substrates is 15 mm as in Example 12, the filling amount is approximately 3 mg/cm$^2$ at the filling rate of 0.12 vol. %. Accordingly, in view of the density, the filling rate has to be approximately 0. 1% or more.

Further, in view of the display density, the preferable filled state of the particles filled between the substrates is that the projected area rate of the particles adhered to the display substrate surface is 30% or more (display black density is 0.8 or more), preferably 50% or more (display black density is 1.2 or more), more preferably 60% or more (display black density is 1.3 or more). (Refer to FIG. 41.).

The filling amount shown in Table 1 and FIG. 42 is a value in the image display medium 10 according to the first embodiment, and it varies depending on the specific gravity of the particles used.

EXAMPLE 2

The mixed particle groups were encapsulated into sample bottles each having an inner wall coated with a display substrate inner surface material (polycarbonate resin), and stirred well with a stirrer until the amount of charge was saturated. Subsequently, the average amount of charge of the particles was measured with a charge spectrograph. Further, the particle groups were contained between the substrates, and the voltage was applied between the substrates to measure the electric field movement of the particles and the display density thereof. The results are shown in Table 2.

TABLE 2

| | Average amount of charge (fC per particle) | | | Display density | |
|---|---|---|---|---|---|
| | Black particle | White particle | Movement of particles | Black display | White display |
| Ex. 1 | +15 | −15 | Separated and moved in different directions | 1.6 | 0.3 |
| Ex. 2 | +10 | −5 | Separated and moved in different directions | 1.4 | 0.4 |
| Ex. 3 | +60 | −15 | Separated and moved in different directions | 1.3 | 0.4 |
| Comp. Ex. 1 | +3 | +3 | Moved in the same direction | 0.9 | 0.9 |
| Comp. Ex. 2 | +3 | −3 | Separated and moved in different directions | 1.0 | 0.8 |
| Comp. Ex. 3 | +165 | −30 | Unseparated and moved in the same direction | 1.1 | 1.0 |

When the average amount of charge of particles having the average particle diameter of 20 μm was between 5 and 60 fC per particle, the particles were separated, and moved in the different directions between the substrates, showing the satisfactory display density. Meanwhile, when the average amount of charge was 3 fC per particle, the particles were separated, and moved in the different directions between the substrates, but did not show a satisfactory display density. Further, when the charge polarity of the particles was the same and the average amount of charge thereof was also the same, the particles were unseparated, and moved in the same direction, providing no display density contrast. Still further, when the amount of charge was 165 fC per particle, the particles were unseparated, and moved in the same direction in the form of an agglomerate. The display density contrast was small.

The average amount of charge (fC per particle) of particles was approximately in proportion to a square of the average particle diameter 2r of the particles. The smaller the average particle diameter, the smaller the average amount of charge (fC per particle). In consideration of this, it is found that the average amount of charge of the particles is preferably at least 5×(r²/10²) fC per particle and at most 150× (r²/10²) fC per particle for obtaining the display density contrast required for the image display.

Second Embodiment

The second embodiment of the invention is described in detail below by referring to the drawings.

Figure 33:
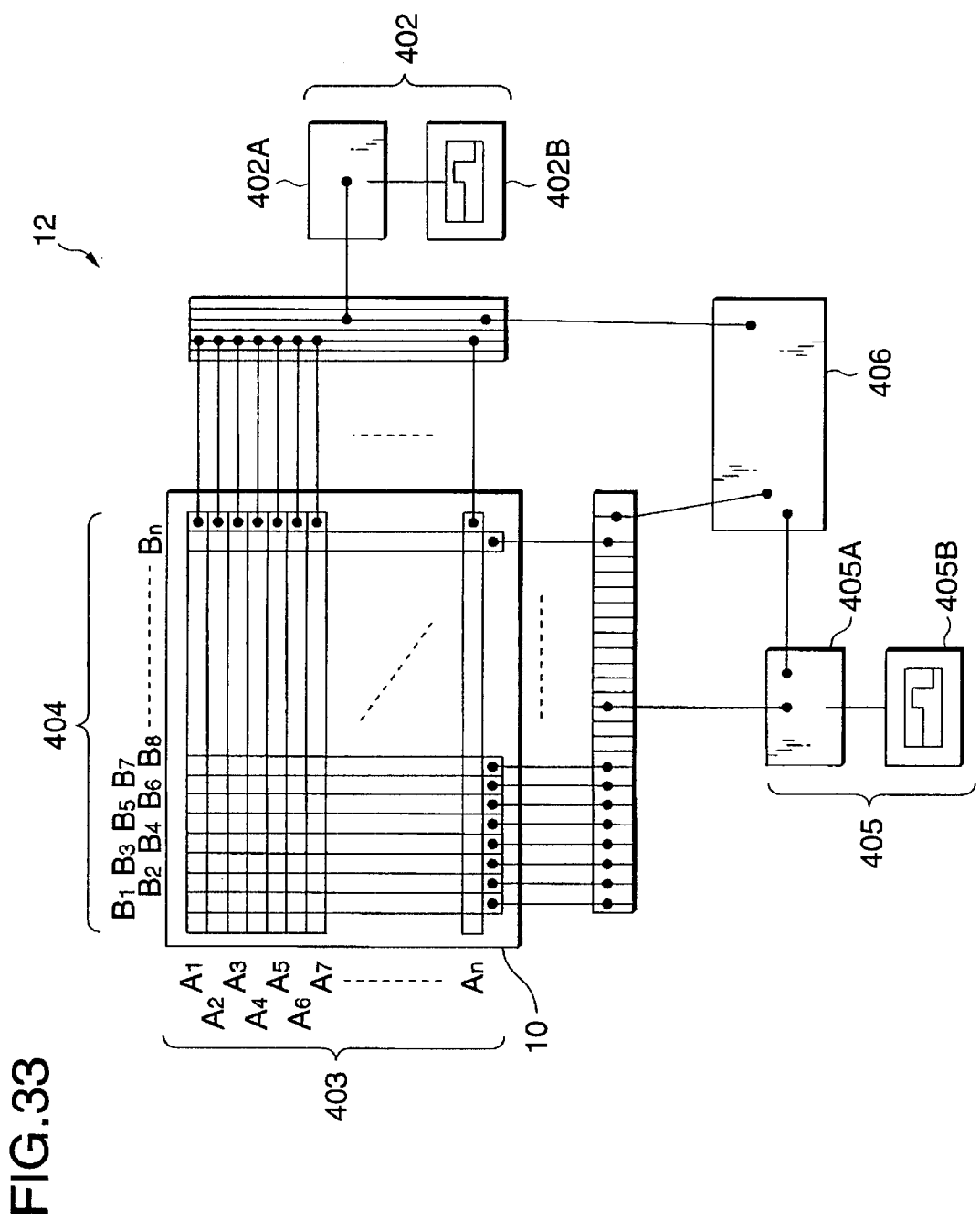
FIG. 33 is a schematic view showing an image-forming apparatus according to the second embodiment.

FIG. 33 shows an image display medium 10 using a simple matrix according to this embodiment and the image-forming apparatus 12 for forming the image on the image display medium 10. Electrodes 403An and 404Bn (n is an integer) are formed in a simple matrix structure, and plural particle groups different in charging properties are contained in a gap held by the electrodes 403An and 404Bn. A potential is generated in each of the electrodes 403An and 404Bn by an electric field-generating device 405 constructed of a waveform-generating unit 405B and a power supply 405A. A timing of potential driving of electrodes is controlled with a sequencer 406 to control the voltage driving of the electrodes. An electric field by which particles can be driven with a line unit can be applied to the electrodes 403A1 to 403An on one surface and an electric field adapted to the image information can be applied to the electrodes 404B1 to 404Bn on another surface internally at the same time.

Figure 34:
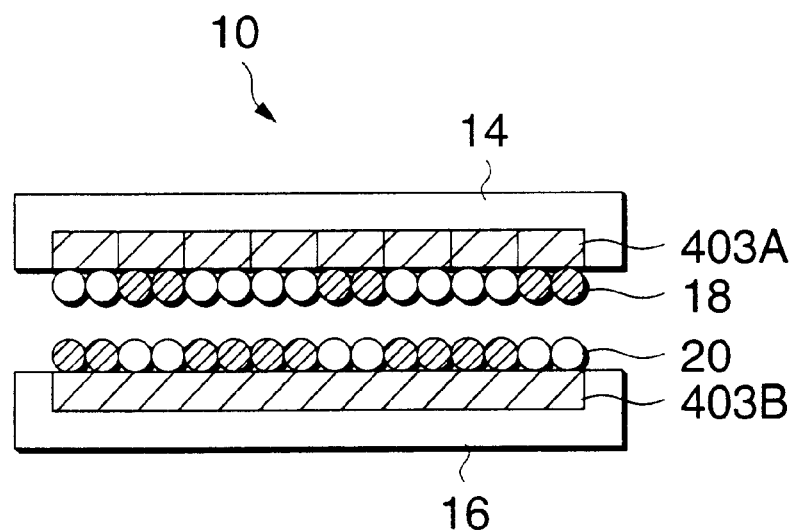
FIG. 34 is a view showing another example of the image display medium.
Figure 35:
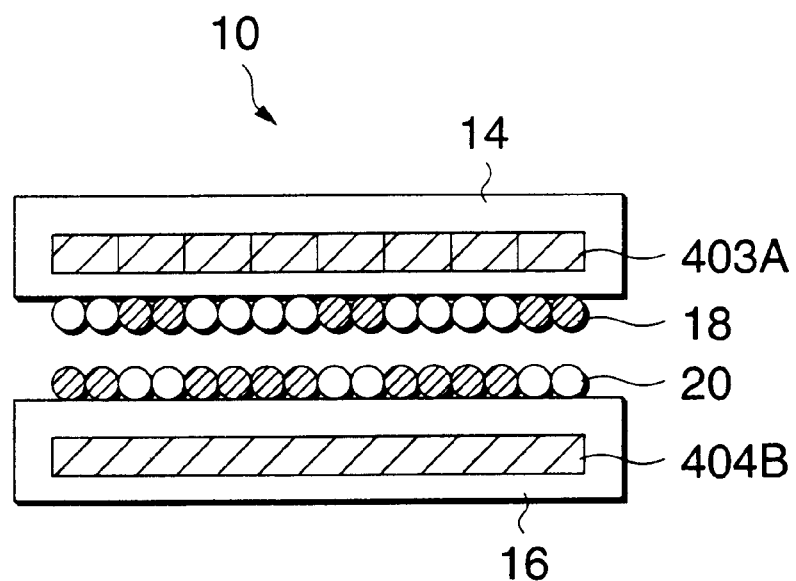
FIG. 35 is a view showing another example of the image display medium.
Figure 36:
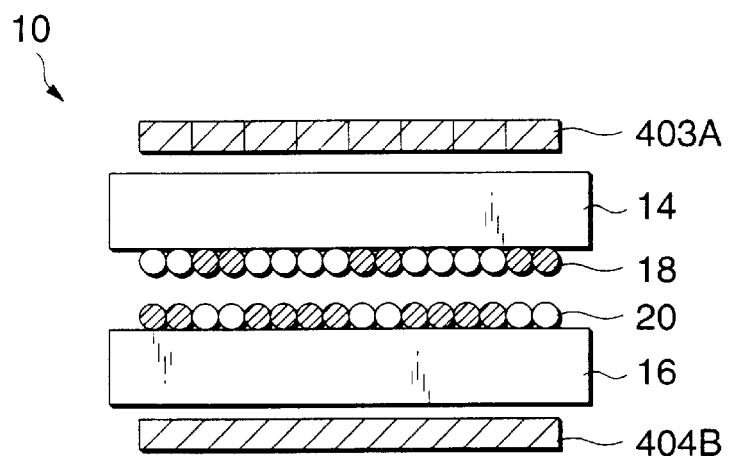
FIG. 36 is a view showing another example of the image display medium.

FIGS. 34, 35 and 36 each show a section of an image-forming portion on an optional surface of FIG. 33. The particles are contacted with the electrode surface or the substrate surface. At least one surface of the substrate is transparent, and the color of the particles can be seen from outside. The electrodes 403A and 404B may be integrally embedded in the substrates as shown in FIGS. 34 and 35, or may be separated from the substrates as shown in FIG. 36.

Figure 37:
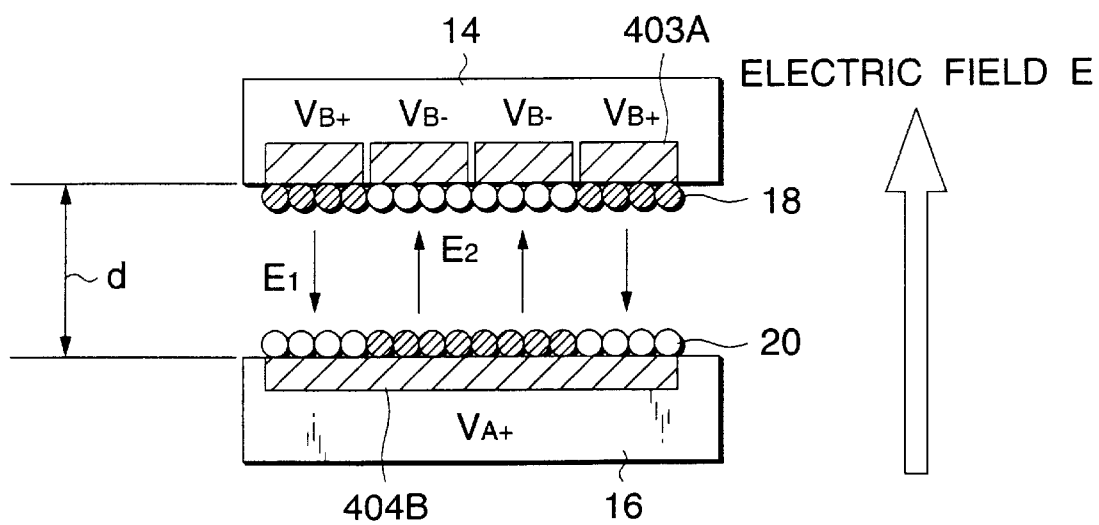
FIG. 37 is a view showing an action of the movement of the particles in the image display medium.
Figure 38:
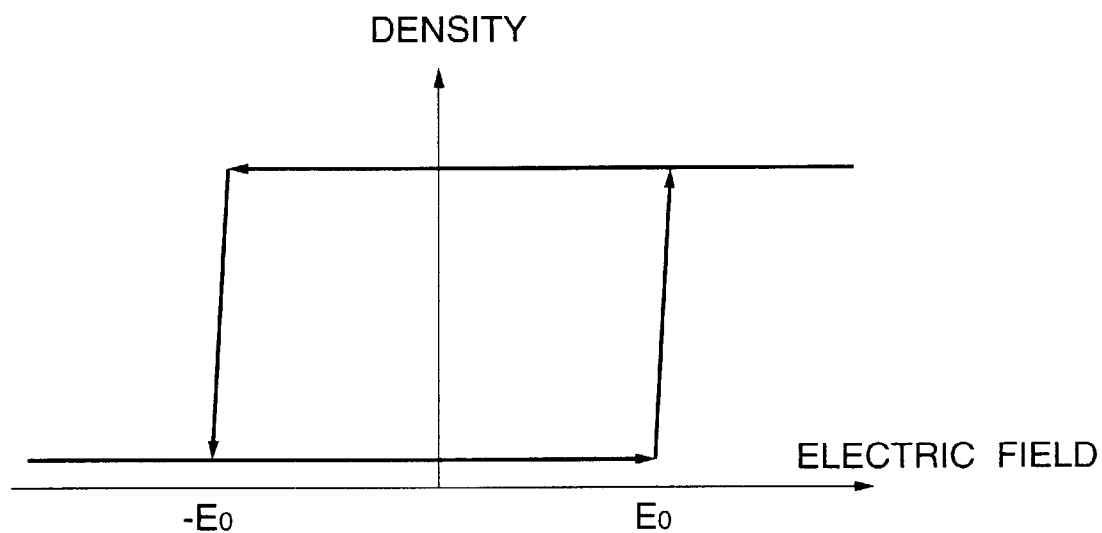
FIG. 38 is a schematic view showing a relation of a driving voltage and a display density of the image display medium.

An example of conducting simple matrix driving in the foregoing construction is described by referring to FIG. 37. The black and white display is provided using black particles as color particles in which the white particles 20 are negatively charged and the black particles 18 are positively charged. The threshold value of the electric field in which the particles are moved is defined as $\pm E_0$. That is, a particle group having a relation of a display density and an electric field as shown in FIG. 38 is used. The display surface is on the row side, and the electric field toward the display surface is positive. A line to be driven is defined as $A_K$, and an optional line as $B_k$. A driving voltage $V_{AK}$ is applied to the electrode 403A, while the particles are influenced by the amount of charge of particles and the electric field between the substrates. Accordingly, the surface potential of the substrate inner surface in contact with the particles is defined. The surface potential $V_{A+}$ is defined as to a line contributed to driving, and the surface potential $V_{A-}$ is defined as to a line not contributed thereto. Likewise, with respect to the driving voltage $V_{BK}$ of the electrode 404B, the surface potential of the substrate inner surface in contact with the particles is defined. A surface potential $V_{B+}$ is defined as to a line contributed to white display, and a surface potential $V_{B-}$ is defined as to a line not contributed thereto. Further, a difference between the substrates is defined as d.

The mechanism of the particle movement in each electric field is described below. In the line contributed to driving, the potential $V_{A+}$ is generated in the line stripe, and the potentials $V_{B+}$ and $V_{B-}$ are generated in the row stripe according to the display contents of the driving line. At this time, the electric field applied between the substrates is shown as follows.

$$E_1=(V_{B+}-V_{A+})/d,\ E_2=(V_{B-}-V_{A+})/d \tag{1}$$

For conducting the white display, the electric field has to be greater than the positive threshold value. Accordingly, the following condition is required.

$$E_1>E_0 \tag{2}$$

Likewise, for conducting the black display, the electric field has to be greater than the negative threshold value. Accordingly, the following condition is required.

$$E_2<-E_0 \tag{3}$$

In this case, when the black display is previously applied to the whole surface, it is acceptable that the white particles are not moved and that a strong positive electric field is not generated on the line side. That is, the following condition is also available.

$$E_1>E_0>E_2 \tag{4}$$

Figure 39:
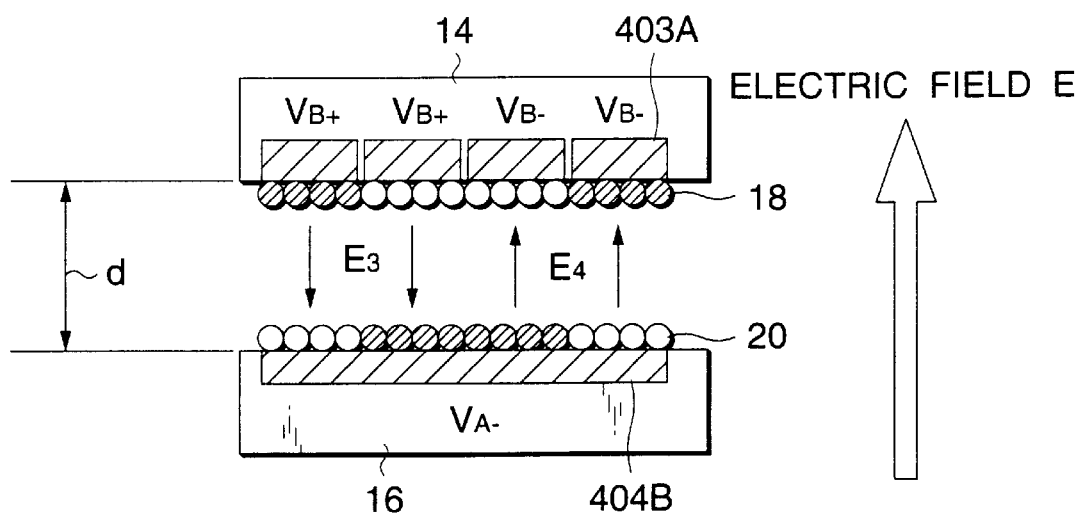
FIG. 39 is a view showing another action of the movement of the particles in the image display medium.

In a line not contributed to driving, as shown in FIG. 39, the potential $V_{A-}$ is generated in the line stripe, and the potentials $V_{B+}$ and $V_{B-}$ are generated in the row stripe according to the display contents of the driving line. At this time, the electric field applied between the substrates is shown as follows.

$$E_3=(V_{B+}-V_{A-})/d,\ E_4=(V_{B-}-V_{A-})/d \tag{5}$$

For not conducting the driving, the particles have to be fixed regardless of the display color.

Accordingly, the electric field has to be smaller than the threshold value regardless of the polarity, as mentioned below.

$$|E_3|<E_0,\ |E_4|<E_0 \tag{6}$$

As stated above, the display by the simple matrix driving can be conducted by determining the electric field to meet the conditions ((2), (3) or (4)) and (6).

The particles can be driven when they have the threshold value of the movement to the electric field. The color, the charge polarity, the amount of charge and the form of the particles are not limited.

EXAMPLE 1

Examples of the second embodiment are described below.

A 7059 glass substrate (40×50×1.1 mm) with a transparent electrode ITO made of eight 4-mm pitch stripes was used in the display substrate electrode 403A and the non-display substrate electrode 404B constituting the outside of the image display medium 10. An inner surface in contact with the particles of the glass substrate is coated with a polycarbonate resin to a thickness of 5 μm. A central portion of a silicone rubber plate having a size of 40×40×0.3 mm is cut out to a square of 15×15 mm to form a space, and this silicone rubber plate is mounted on the non-display substrate 403. Spherical fine particles (obtained by classifying Tech-Polymer MBX-20-White made by Sekisui Chemical Co., Ltd.) of titanium oxide-containing crosslinked polymethyl methacrylate containing a fine powder of titania treated with isopropyltrimethoxysilane at a weight ratio of 100 to 0.1 and having a volume average particle diameter of 20 μm and spherical fine particles (obtained by classifying Tech-Polymer MBX-20-Black made by Sekisui Chemical Co., Ltd.) of carbon-containing crosslinked polymethyl methacrylate having a volume average particle diameter of 20 μm are mixed at a weight ratio of 2:1. Approximately 25 mg of the mixed particles are sifted out on the square space cut in the silicone rubber plate through a screen. Subsequently, the display substrate electrode 403A and the non-display substrate electrode 404B are closely adhered to the silicone rubber plate such that these electrodes are mounted in a matrix state, and the substrates are held with a double clip under pressure to closely adhere the silicone rubber plate to the two substrates and form the image display medium 10. At this time, the distance between the electrodes is 0.3 mm.

Next, the determination of the potential required for the driving is described upon using an example corresponding to the mechanism noted above.

The matrix driving was conducted on condition that $V_{A+}=-400$ V was defined in a line contributed to driving, $V_{A-}=0$ V in a line not contributed thereto, $V_{B+}=+400$ V in a line contributed to white display and $V_{B-}=0$ V in a line contributed to black display respectively. In the construction of this Example, the threshold value for movement of the particles is ±500 V, and $E_0=1.5$ MV/m. Likewise, $E_1=2.4$ MV/m, $E_2=1.2$ MV/m, $E_3=1.2$ MV/m, and $E_4=0$ MV/m.

Since formulas (4) and (6) are satisfied, the matrix driving can be conducted. In this Example, the method to satisfy the formula (4) was used. Accordingly, the driving of the whole surface was conducted such that the electric field for previous whole surface black display was $E_x=-2.4$ MV/m, and the display driving was then conducted.

Consequently, any pattern with the same density contrast as that of a single pixel could be formed for a driving time of 0.1 second per line.

EXAMPLE 2

A driving example is described in which a driving voltage is reduced upon using an ITO transparent substrate with plural stripes and a shortened distance between electrodes.

The driving was conducted under the following conditions. A combination of particles was the same as in Example 1. An ITO electrode was used in which 480 0.4-mm-pitch stripes were embedded on a line side and 640 0.4-mm-pitch electrodes on a row side respectively. As a driver, 15 pieces of ECN2112 manufactured by Hitachi Ltd. were arrayed on a line side and 20 pieces of ECN2001 manufactured by Hitachi Ltd. on a row side respectively. A distance between the electrodes was 0.12 mm.

The experiment was conducted as in Example 1 on condition that $V_{A+}=-160$ V, $V_{A-}=0$ V, $V_{B+}=+50$ V and $V_{B-}=0$ V. Formulas (4) and (6) were satisfied with $E_1=1.75$ MV/m, $E_2=1.33$ MV/m, $E_3=0.42$ MV/m and $E_4=0$ MV/m. The method to satisfy formula (4) was used. Accordingly, the driving of the whole surface was conducted such that the electric field for previous whole surface black display was $E_x=-1.75$ MV/m, and the display driving was then conducted. Consequently, it could be identified that the image was displayed for a driving time of 5 msec per line.

Third Embodiment

The third embodiment is described in detail below by referring to the drawing.

Figure 40:
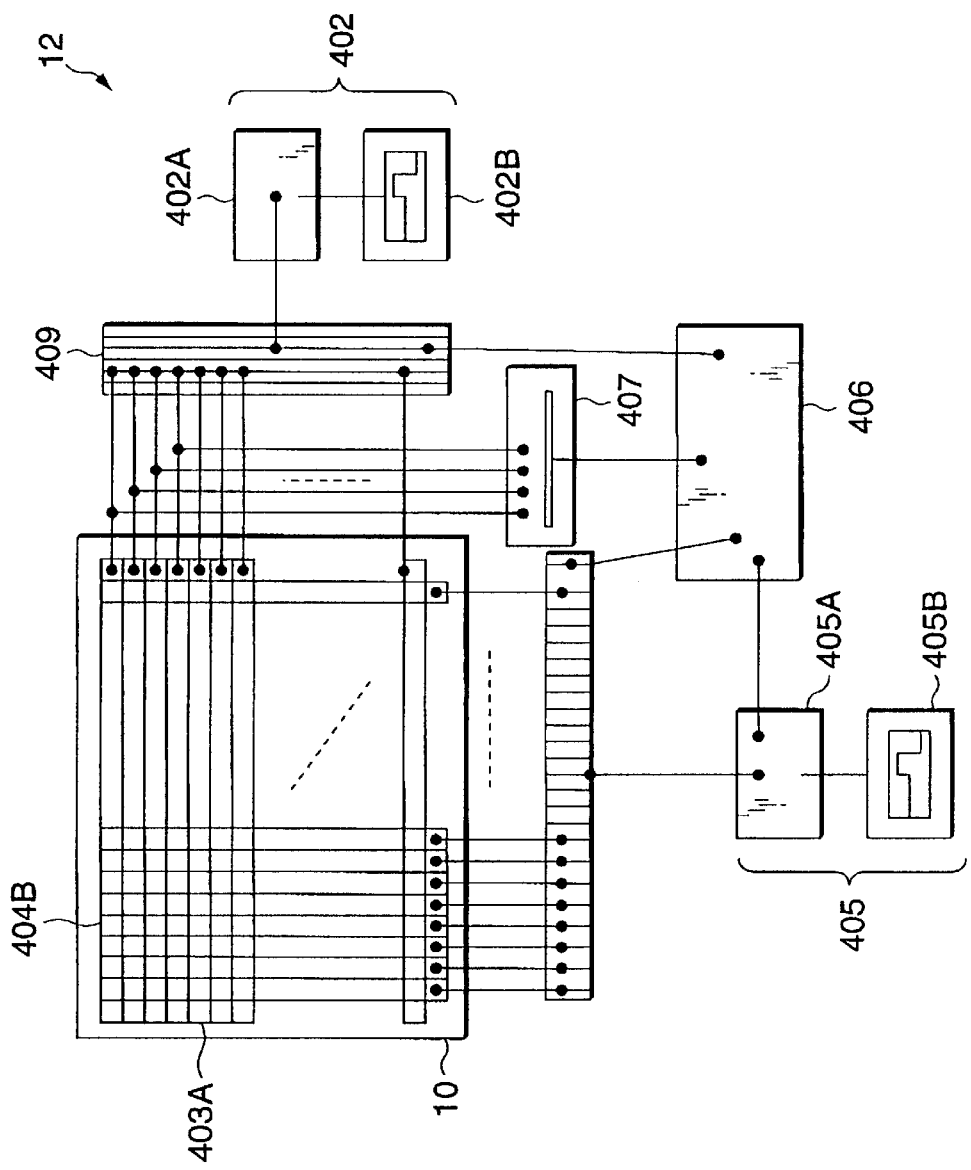
FIG. 40 is a schematic view of the image-forming apparatus according to the third embodiment.

A method in which an alternating field is applied to the image display medium just before applying an electric field adapted to the image information is described by referring to FIG. 40. Electrodes 403A, 404B have a simple matrix structure, and plural particle groups different in charging properties are contained in a space held by both the electrodes. A potential is generated in the electrodes 403A, 404B by an electric field-generating device 402, and the potential of the electrodes is controlled with a sequence 406. The electric field adapted to the image information is applied to the electrode 403 A on one surface internally at the same time, and the electric field by which the particles can be driven by one line unit is applied to the electrode 404B on the other surface. At this time, the electric field-generating device is constructed of an amplifier 407, a waveform-generating device 405B and a relay 409. The relay 409 can shortcircuit all the electrodes 404B by an ON signal. Further, the waveform-generating device 405B generates a waveform determined by a trigger ON signal.

An action in which an alternating field is applied to the whole surface is described below. When the relay 409 is in the ON condition, the whole surface of one electrode 404B has the same potential, and an initializing potential is applied from the sequencer 406. The power supply 405A formed on the surface A or the surface B by the waveform-generating device 405B amplifies the waveform from, for example, a waveform-generating device (manufactured by Wavetek) with a high-voltage power supply and applies an alternating field between the substrates to forcibly vibrate the particles. Consequently, the particles tend to be charged and moved by the electric field.

At this time, since there is a need to release the adhesion between the particles and the substrates or between the particles, it is necessary to apply a force close to an impulse force for elimination. When the particles stand still, the state in which the particles are adhered by the force due to the electric field has to be eliminated. At this time, when the electric field is gradually increased or the electric field takes a gradually increasing waveform such as a waveform of a sine wave, the particles strongly adhered cannot be peeled off. Accordingly, when the electric field takes a waveform such as a waveform of a rectangular wave, a force by which to peel off the particles agglomerated is provided as if a type of an impulse wave is generated. As is clear from the fact that the alternating field to be generated has a rectangular wave, a part of a rectangle may be earthed. In this case, a DC electric field is intermittently generated, but the action is not changed at all.

When the particles are present in air, a force applied to the particles is only an image force qE by the electric field, and the particles are adhered while a force is applied to the opposite surface. At this time, an adhesion $F_{v1}$ is a force against the image force. Accordingly, in order to separate again the particles adhered, a force greater than a force $qE_1$ applied by the electric field when the particles are adhered is needed. That is, when the electric field greater than $E_1$ is applied, the particles can be moved.

Thus, the adhesion applied by the movement of the particles between the substrates is decreased by gradually decreasing the amplitude of the alternating field, and the alternating field expedites the frictional charging by the contact between the particles or between the particles and the substrates to increase the amount of charge of the particles, whereby the movement of the particles by the electric field can easily be conducted.

Fourth Embodiment

The fourth embodiment of the invention is described in detail below by referring to the drawings.

FIG. 1 shows the image display medium 10 and the image-forming apparatus 12 for forming the image on the image display medium 10 according to the embodiment of the invention.

The image display medium 10 is so adapted that the particles 18 and the particles 20 different from each other in color are contained between the display substrate 14 on which the image is displayed and the non-display substrate 16 opposite thereto. Further, the display substrate 14 and the non-display substrate 16 are formed of a dielectric.

As the dielectric used in the display substrate 14 and the non-display substrate 16, an insulating resin is mentioned. Further, a self-supporting film is preferable. Examples thereof include a polyester, polypropylene and polyethylene.

With respect to the particles 18, 20, when one group of the particles is insulating, another group may have any of a conductivity, a hole-transporting property, an electron-transporting property and an insulating property. Examples of the material of the conductive particles include carbon black, metals such as nickel, silver, gold, tin and stainless steel, alloys such as ITO, and inorganic pigments such as titanium oxide. Conductive particles are particles containing these as a component, or particles obtained by coating or containing these on or in surfaces of other fine particles. Specific examples thereof include spherical conductive particles (Micropearl NI made by Sekisui Chemical Co., Ltd.) obtained by applying electroless nickel plating to surfaces of fine particles made of a crosslinked copolymer containing divinylbenzene as a main component, spherical conductive particles (Micropearl AU made by Sekisui Chemical Co., Ltd.) obtained by further applying gold substitution plating thereto, amorphous carbon spherical conductive particles obtained by carbonization and calcination of a thermosetting phenol resin (Univeks GCP, H-Type made by Unitika Ltd.: volume resistivity $\leq 10^{-2}$ Ω·cm), spherical conductive particles (Univeks GCP made by Unitika Ltd.: volume resistivity $\leq 10^{-4}$ Ω·cm) obtained by further surface-coating metal such as gold or silver, spherical conductive particles (Admafine made by Admatechs Co., Ltd.) obtained by coating Ag and tin oxide on surfaces of spherical oxide fine particles of silica and alumina, and particles obtained by adhering or embedding a conductive fine powder to or in surfaces of main particles made of various materials such as a styrene resin, an acrylic resin, a phenolic resin, a silicone resin and glass. Particles having different colors such as color particles of cyan, magenta, yellow, red, green and blue, and white or black colors are also available. Examples of white and black particles include spherical particles (Micropearl SP, Micropearl BB made by Sekisui Chemical Co., Ltd.) formed of a crosslinked copolymer containing divinylbenzene as a main component, fine particles of crosslinked polymethyl methacrylate (crosslinked polymetgacrylic acid methyl) (MBX-20 Black, White made by Sekisui Plastics Co., Ltd.), fine particles (ARX-15 Black, White made by Sekisui Chemical Co., Ltd.) of crosslinked polyacrylic acid ester, fine particles (BMX-15 Black, White made by Sekisui Plastics Co., Ltd.) of crosslinked polybutyl methacrylate, fine particles of polytetrafluoro ethylene (Rubron L made by Daikin Kogyo Co., Ltd., SST-2 made by Shamrock Technologies Inc.) and silicone resin fine particles (Tospearl made by Toshiba Silicone).

The material of the insulating particles includes insulating resins and inorganic materials. Examples thereof include resins such as a polystyrene resin, a polyester resin, an acrylic resin and a silicone resin, engineering plastics, and inorganic materials such as glass and ceramics.

The material having the hole-transporting property include a hydrazone compound, a stilbene compound, a hydrazone compound and an arylamine compound. Examples of the material having the electron-transporting property include a fluorenone compound, diphenoxy derivatives, a pyrane compound and zinc oxide.

In this embodiment, the particles 18 are black particles 18, and the particles 20 are white particles 20, having the following properties.

TABLE 3

| Type of particles | Material | Average particle diameter (μm) | Volume density (kg/m³) |
|---|---|---|---|
| Black particles | amorphous carbon | 7.0 | 1,350 |
| White particles | crosslinked polyacrylic acid ester | 15 | 1,090 |

When the black particles 18 and the white particles 20 are contained between the substrates in approximately equal amounts such that the volume filling rate in the gap is 50% or less, the image display is enabled. The rate of 40% or less is preferable because the image contrast can be given satisfactorily. Further, both the particles are different in a work function. The black particles 18 having a large work function are positively charged by the mutual contact, and the white particles having a small work function are negatively charged by the mutual contact.

When the material having the hole-transporting property or the electron-transporting property is coated on the surfaces of the conductive particles, the particles having each of the properties can be formed.

Figure 44:
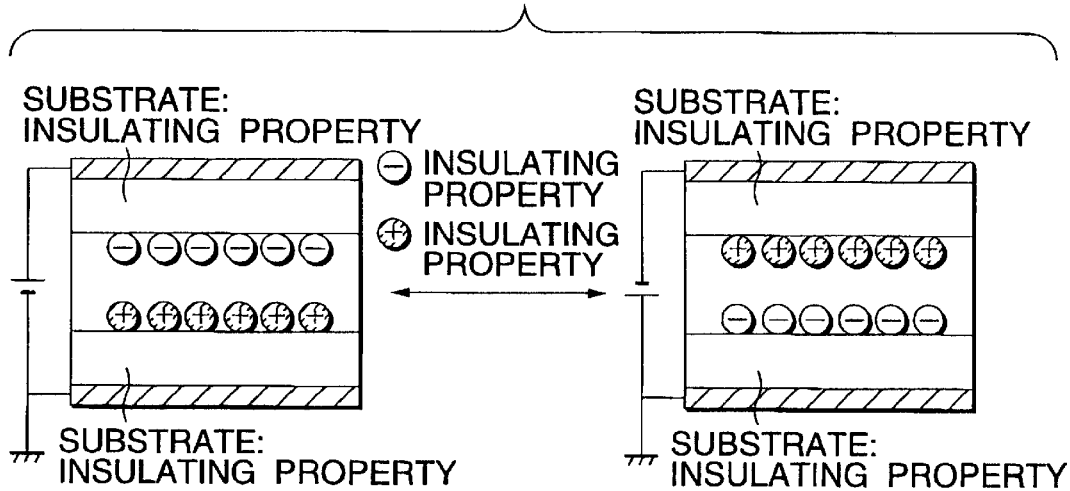
FIG. 44 is a view describing the movement of particles in the image display medium.

In case of the insulating particles, the charge injection into the particles was not conducted even when the substrate had an insulating property, a conductivity, a hole-transporting property or an electron-transporting property. The particles were moved between the substrates by the electric field according to the polarity in the frictional charging of the particles. For example, when two types of insulating spherical fine particles (MBX-Black, White made by Sekisui Chemical Co., Ltd.) of crosslinked polymethyl methacrylate were contained in a space obtained by holding substrates with electrodes coated with an insulating polycarbonate resin, the two types of the particles were moved to the different substrates according to the electric field regardless of the properties of the substrate surfaces. Further, in case of the substrates having the charge-transporting property and the particles in which the charge injection from the substrate to the particles was not conducted, the same results were obtained (refer to A A shown in FIG. 44).

Further, even when one of the particle groups undergoes the charge injection from the substrate, the insulating particles are charged by the contact of the particles because the difference in the work function exists between the particles. For instance, in an example in which spherical conductive particles (Micropearl AU made by Sekisui Chemical Co., Ltd.) and insulating spherical fine particles (MBX-White made by Sekisui Chemical Co., Ltd.) of crosslinked polymethyl methacrylate containing a negative external additive were mixed and encapsulated in a space obtained by holding one substrate with an electrode having a hole-transporting property and another substrate with an electrode coated with an insulating polycarbonate resin, the negatively charged insulating particles were moved according to the electric field between the substrates. Meanwhile, the conductive particles were positively charged by the hole injection from the electrode having the hole-transporting property, moved toward the negative insulating substrate, and adhered thereto. When the electric field was changed over, the two groups of the particles were moved in the opposite directions.

Figure 45:
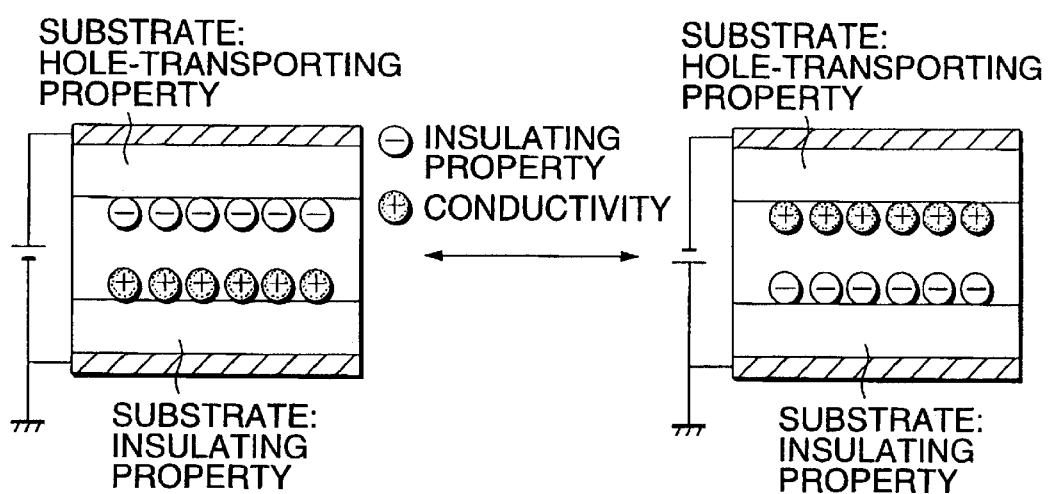
FIG. 45 is a view describing the movement of particles in the image display medium.

Accordingly, the conditions of the particles were observed from the surface (display surface) of the insulating substrate. Then, gold was displayed by the conductive particles when the display surface was negative, and the insulating particles were adhered to the display surface when the display surface was positive to display white (refer to B' A shown in FIG. 45).

Even when one of the particle groups undergoes the charge injection from the substrate, the insulating particles are charged by the contact between the particles because the difference in the work function exists between the particles. For instance, in an example in which spherical conductive particles (Micropearl AU made by Sekisui Chemical Co., Ltd.) and insulating spherical fine particles (MBX-Black made by Sekisui Chemical Co., Ltd.) of crosslinked polymethyl methacrylate were mixed and encapsulated in a space obtained by holding one substrate with an ITO electrode and another substrate with an electrode coated with a polycarbonate resin, the charged insulating particles were moved according to the electric field between the substrates. In this Example, the insulating particles were positively charged, and moved toward the negative pole. Meanwhile, the conductive particles underwent the injection from the conductive electrode by the charge injection from the electrode, and all of the particles were adhered to the insulating substrate.

Figure 46:
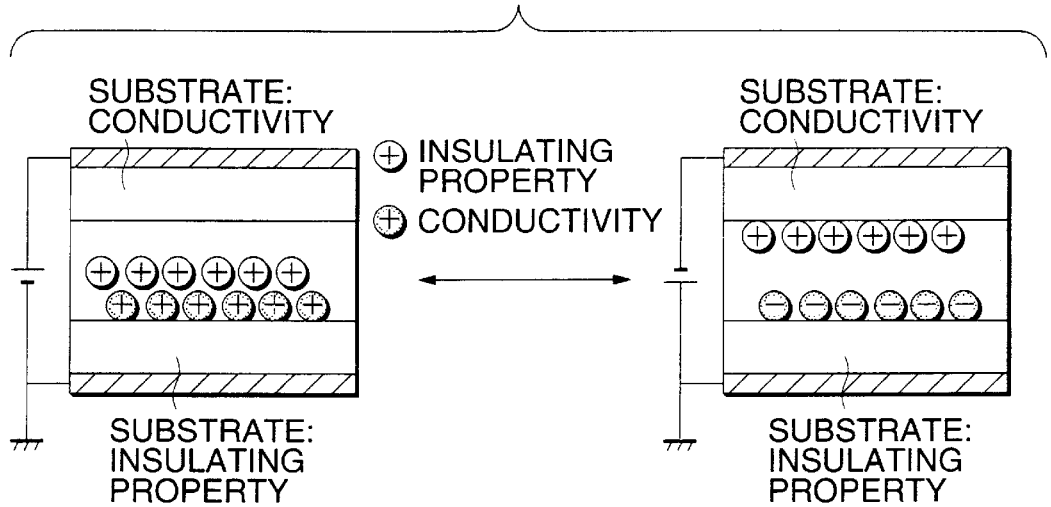
FIG. 46 is a view describing the movement of particles in the image display medium.

Thus, the conditions of the particles were observed from the insulating substrate surface (display surface). Then, the insulating particles and the conductive particles were mixed to conduct black display in case of the negative display surface. The conductive particles were adhered to the display surface to conduct gold display in case of the positive display surface (refer to B' X shown in FIG. 46).

Figure 47:
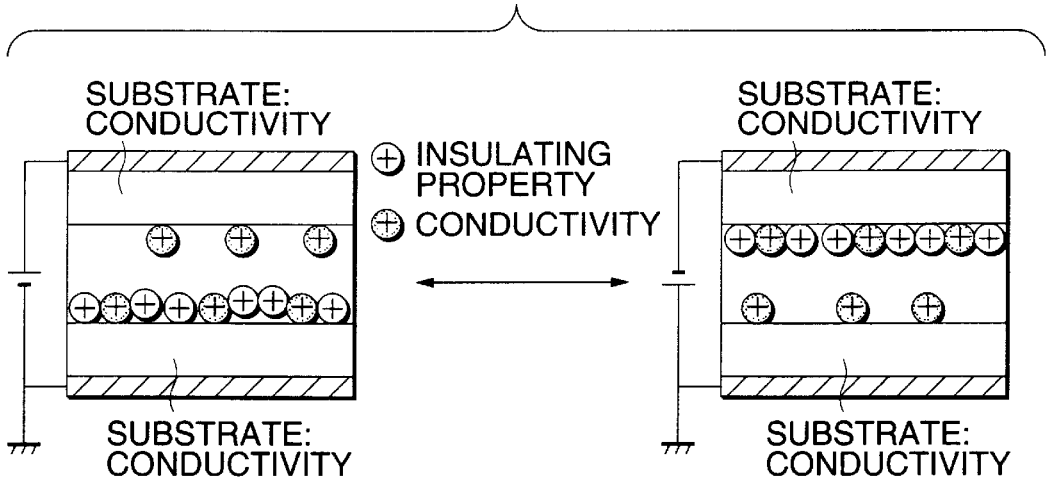
FIG. 47 is a view describing the movement of particles in the image display medium.

When both the substrates had a two-way conductivity, the conductive particles underwent the charge injection from both the substrates by applying the electric field, and were vibrated as shown in FIG. 47. However, as soon as the electric field was stopped, the movement of the particles was stopped. Therefore, the conductive particles were equally adhered to both the substrates. However, since the insulating particles were adhered to one of the substrates according to the electric field, black and gold were displayed on the display surface (refer to B B shown in FIG. 47).

When the two types of the particles were charged through the charge injection and the charging polarities were not determined, the charging polarities of the particles were not fixed, and it was uncertain to which substrate the particles were moved. Thus, no contrast was given. Further, since the particles different in color were neutralized by exchanging the charge, they were not moved. (Refer to the blank in FIG. 43).

The image-forming apparatus 12 has a printing electrode 11, a counter electrode 26 and a power supply 28.

Figure 2A:
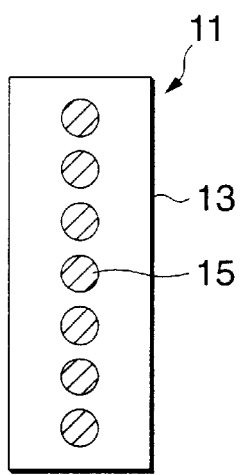
FIGS. 2A through 2C are views showing a pattern of a printing electrode.

As shown in FIGS. 1 and 2A, the printing electrode 11 is constructed of a substrate 13, and plural electrodes 15 having a diameter of, for example, 100 µm.

Figure 2B:
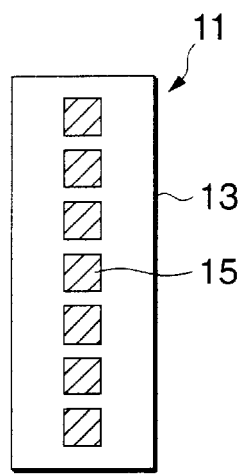
Figure 2C:
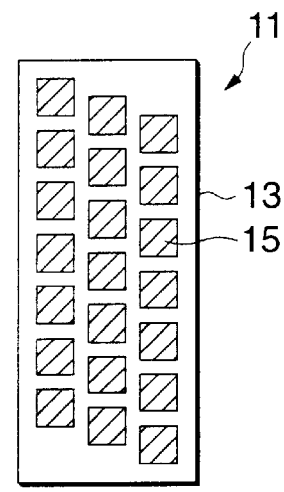

The plural electrodes 15 are, as shown in FIG. 2A, arrayed in a row on one surface of a substrate 34 at a predetermined interval in a direction (that is, main scanning direction) approximately perpendicular to a transporting direction (in the arrow B direction) of the image display medium 10 according to resolution of the image. The electrodes 15 may take a square form as shown in FIG. 2B or may be arranged in a matrix state as shown in FIG. 2C.

Figure 3:
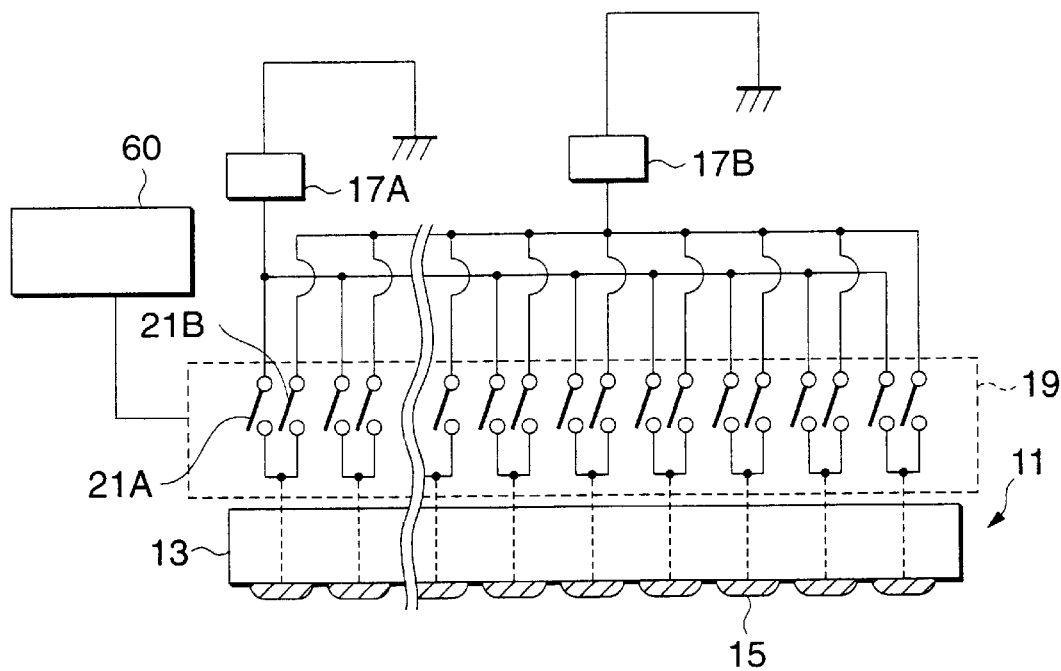
FIG. 3 is a schematic view of the printing electrode.

To each electrode 15, as shown in FIG. 3, an AC power supply 17A and a DC power supply 17B are connected through a connection control portion 19. One end of the connection control portion 19 is constructed of plural switches, namely, a switch 21A whose one end is connected to the electrode 15 and whose another end is connected to the AC power supply 17A, and a switch 21B whose one end is connected to the electrode 15 and whose another end is connected to the DC power supply 17B.

On-off switching of the switches is controlled by a control portion 60, and the AC power supply 17A, the DC power supply 17B and the electrode 15 are electrically connected, whereby an AC voltage, a DC voltage or a voltage obtained by superposing an AC voltage and a DC voltage can be applied.

The function of the fourth embodiment is described below.

First, the image display medium 10 is transported in the arrow B direction by a transporting unit not shown, and sent between the printing electrode 11 and the counter electrode 26. Then, the control portion 60 switches on all the switches 21A upon giving instructions to the connection control portion 19, whereby an AC voltage is applied to all the electrodes 15 from the AC power supply 17A.

When the AC voltage is applied to the electrodes 15, the black particles 18 and the white particles 20 within the image display medium 10 are reciprocated between the display substrate 14 and the non-display substrate 16. As a result, the black particles 18 and the white particles 20 are frictionally charged by the friction between the particles or the friction between the particles and the substrates. For example, the black particles 18 are positively charged, and the white particles 20 are uncharged, or negatively charged. Incidentally, in the following description, the white particles 20 are negatively charged.

The control portion 60 switches on only the switch 17B corresponding to the electrode 15 in a position adapted to the image data upon giving instructions to the connection control portion 19 to apply a DC voltage to the electrode 15 in the position adapted to the image data. For example, a DC voltage is applied to the non-image portion, not to the image portion.

Figure 4:
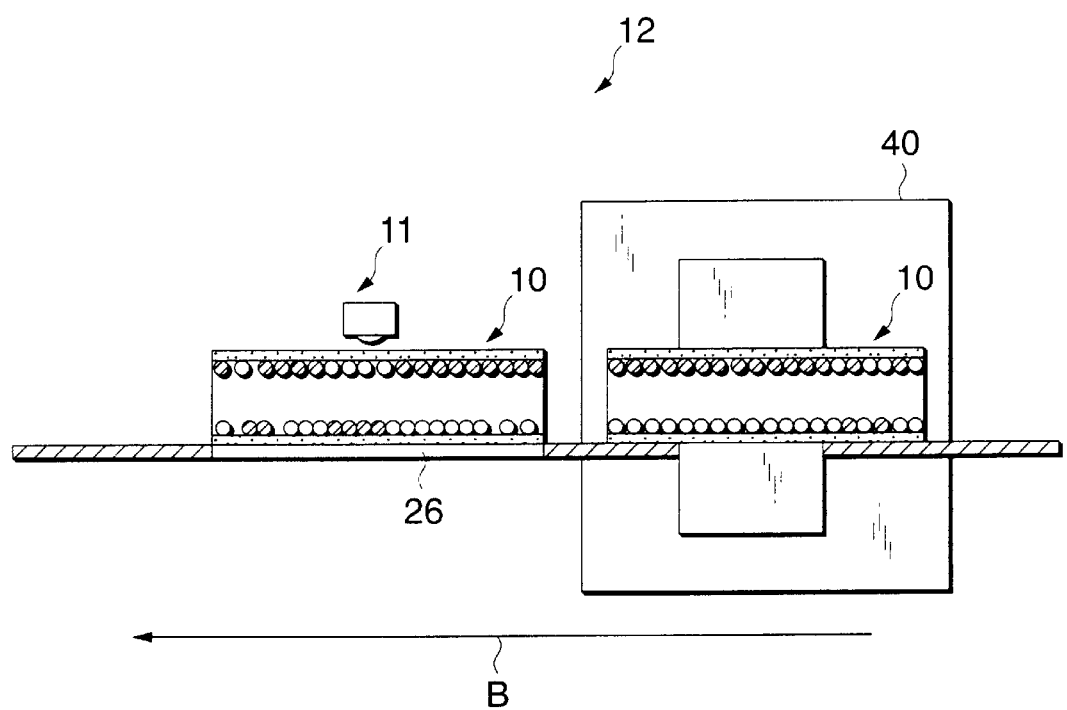
FIG. 4 is a schematic view of an image-forming apparatus according to the fifth embodiment.

Consequently, when the DC voltage is applied to the electrode 15, as shown in FIG. 4, the positively charged black particles 18 present on a portion where the printing electrode 11 is facing the display substrate 14 are moved toward the non-display substrate 16 by the action of the electric field. Further, the negatively charged white particles 20 present on the non-display substrate 16 are moved toward the display substrate 14 by the action of the electric field. Accordingly, since only the white particles 20 appear on the display substrate 14, the image is not displayed on the portion corresponding to the non-image portion.

Meanwhile, when the DC voltage is not applied to the electrode 15, the positively charged black particles 18 present on the portion where the printing electrode 11 is facing the display substrate 14 remain on the display substrate 14 by the action of the electric field. Further, the positively charged black particles 20 present on the non-display substrate 16 are moved toward the display substrate 14 by the action of the electric field. Accordingly, since only the black particles 20 appear on the display substrate 14, the image is displayed on the portion corresponding to the image portion.

Consequently, since only the black particles 18 appear on the display substrate 14, the image is displayed on the portion corresponding to the image portion.

In this manner, the black particles 18 and the white particles 20 are moved according to the image, and the image is displayed on the display substrate 14. When the white particles 20 are not charged, only the black particles 18 are moved by the influence of the electric field. The black particles 18 in a portion where the image is not displayed are moved to the non-display substrate 16, and concealed with the white particles 20 from the display substrate 14 to enable the image display. Further, even after the electric field generated between the substrates of the image display medium 10 is lost, the image displayed is maintained with the adhesion inherent in the particles. Since these particles can be moved again through the generation of the electric field between the substrates, the image can repetitively be displayed by the image-forming apparatus 12.

Thus, since the charged particles are moved by the electric field with air as a medium, the safety is high. Further, since air has a low viscosity resistance, the high-speed response can also be satisfied.

Fifth Embodiment

The fifth embodiment is described below by referring to the drawings.

The image-forming apparatus 12 shown in FIG. 4 has an initializer 40 for charging the black particles 18 and the white particles 20 in the image display medium 10 and uniformly adhering the black particles 18 to the display substrate 14. Except this point, the apparatus is the same as the image-forming apparatus 12 shown in the first embodiment. Accordingly, the detailed description thereof is omitted.

Figure 5:
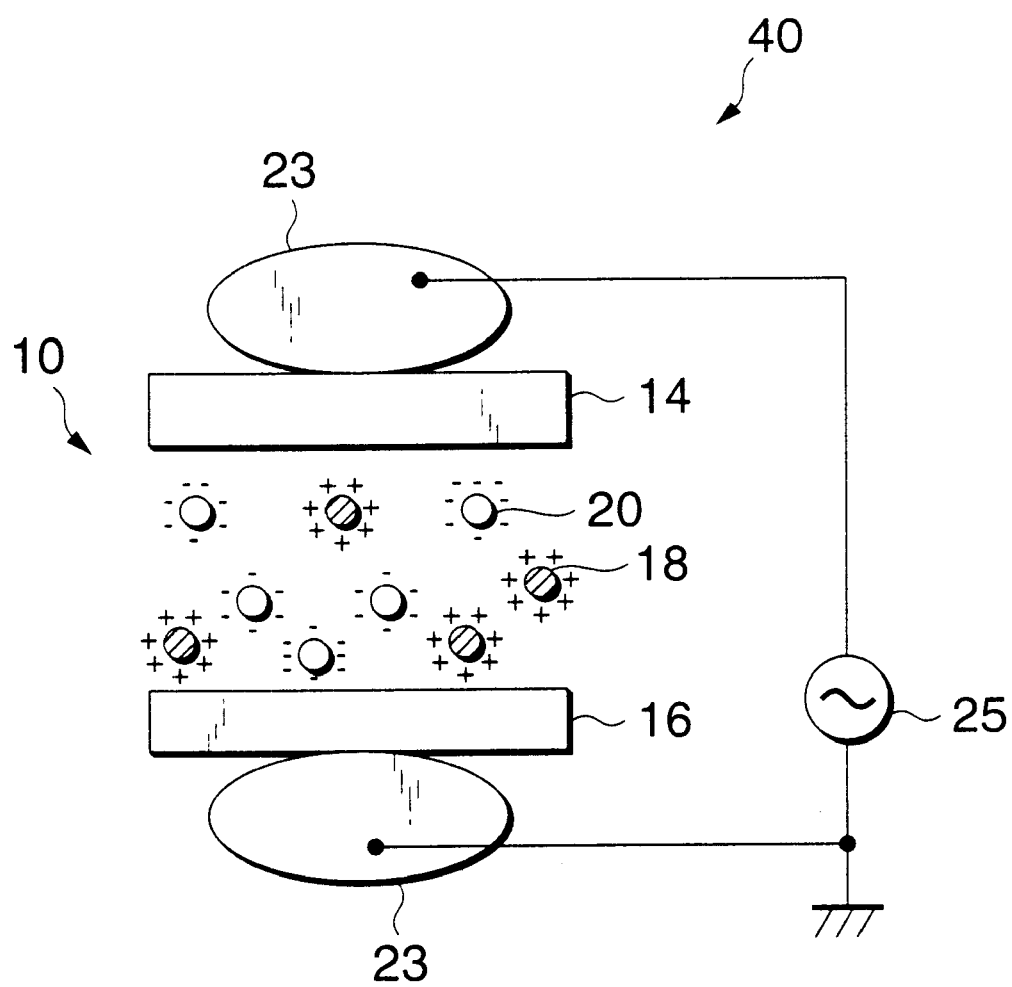
FIG. 5 is a schematic view of an initializer.

The initializer 40 has, as shown in FIG. 5, a pair of electrodes 23 which are connected to an AC power supply 25.

The AC power supply 25 applies an AC voltage to the electrodes 23, whereby the black particles 18 and the white particles 20 in the image display medium 10 are reciprocated between the display substrate 14 and the non-display substrate 16. As a result, the black particles 18 and the white particles 20 are frictionally charged by the friction between the particles or the friction between the particles and the substrates. For example, the black particles 18 are positively charged, and the white particles 20 are not charged or are negatively charged. In the following description, the white particles 20 are negatively charged.

A voltage obtained by superposing an AC voltage and a DC voltage may be applied. When the particles are charged in interposing the same between the substrates or when the particles are charged before the image formation in the repetitive rewriting, the particles are charged well by the friction between the particles or the friction between the particles and the substrates.

Figure 6:
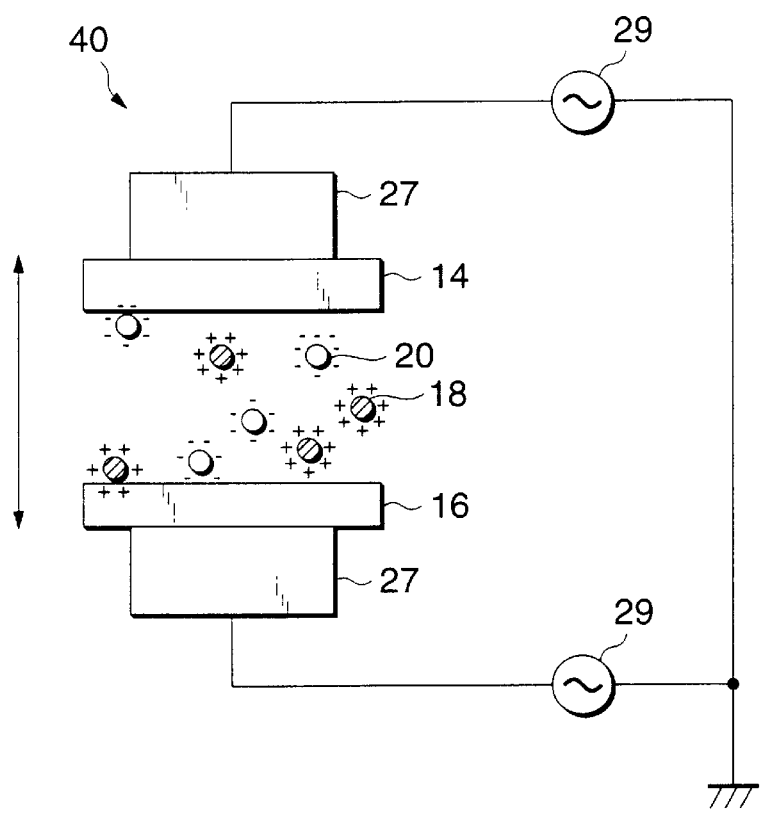
FIG. 6 is another schematic view of an initializer.

As shown in FIG. 6, it is also possible that the display substrate 14 and the non-display substrate 16 which are facing each other are contacted with a pair of vibrators 27, and the vibrators 27 are vibrated by applying an AC voltage thereto through AC power supplies 29 to vibrate the particles for frictional charging.

Figure 7:
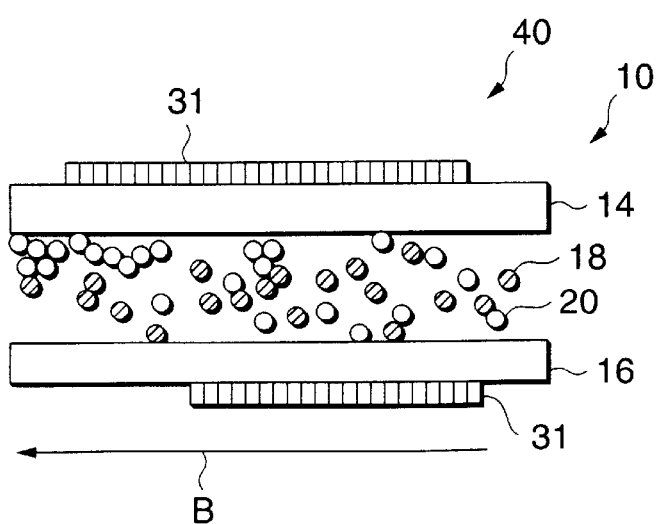
FIG. 7 is another schematic view of an initializer.

As shown in FIG. 7, it is also possible that the particles are stirred with an alternating field by a pair of magnetic plates 31 to induce the friction between the particles or the friction between the particles and the substrate surfaces for charging the particles. In the magnetic plates 31, a magnetic polarity is successively changed according to the advance direction of the image display medium 10. Therefore, the black particles 18 magnetically attracted repeat attraction and separation according to the magnetic polarity, and are moved around within the substrates. The particles are contacted with one another, and a static charge is applied to the particles. Any magnetic plate may be used as the magnetic plate 31 so long as it shows magnetism and expedites the magnetic attraction. For example, it is also possible that a current flows in the passage of the image display medium 10 using a coil instead of the magnetic plates 31 to form a magnetic field with the action of an electromagnet and the frictional charging is thereby conducted. Further, the direction of the magnetic field is fixed in a position where the image display medium 10 is separated from the magnetic field, which makes it possible to adhere, for example, the black particles 18 to one substrate desired and to prevent the image drop in the image formation by the electric field. Still further, one surface of the magnetic plate 31 is made longer than another surface thereof to finally correct the particles magnetically attracted to one surface.

In this case, for example, at least the black particles 18 or the white particles 20 have to be magnetic. As the particles, for example, particles made of a magnetic powder as a core and a resin colored with a pigment having a hiding power as a shell can be used. As a magnetic material, a powder of a ferromagnetic metal such as magnetite, ferrite or iron, an alloy or a powder of an oxide, an oxide magnetic material such as black magnetite, γ-hematite, chromium dioxide or ferrite, or a powder or a lamina of a magnetic metal material such as cobalt or nickel alloy is used. As a coloring material having a hiding power, carbon black is used to provide black particles, and a white pigment such as titanium oxide is used to provide white particles.

It is advisable that the black particles 18 and the white particles 20 are charged in mutually opposite polarities. When these particles are charged in mutually opposite polarities, it is possible to prevent the particles from being moved and adhered to the substrate facing the substrate to which the particles are required to be moved when the particles are moved by the electric field for image formation. Further, since the particles forming the image portion and the particles forming the non-image portion are moved in the opposite directions by the electric field, an image having a high contrast and a high sharpness can be formed.

The function of the fifth embodiment is described below.

When the image display medium 10 shown in FIG. 4 is transported in the arrow B direction by a transporting unit not shown and sent between the electrodes 23 of the initializer 40 as shown in FIG. 5, an AC voltage is applied by an AC supply 25.

Consequently, the black particles 18 and the white particles 20 in the image display medium 10 are reciprocated between the display substrate 14 and the non-display substrate 16, and the black particles 18 and the white particles 20 are frictionally charged by the friction between the particles or the friction between the particles and the substrates. Thus, for example, the black particles 18 are positively charged, and the white particles are negatively charged.

When the image display medium 10 is transported to the position of the printing electrode 11, the control portion 60 gives instructions to the connection control portion 19 to switch on only the switch 21B corresponding to the electrode 15 in the position adapted to the image data, whereby a DC voltage is applied to the electrode 15 in the position adapted to the image data. For example, the DC voltage is applied to the non-image portion, but not to the image portion.

Consequently, when the DC voltage is applied to the electrode 15, as shown in FIG. 4, the positively charged black particles 18 present on the portion where the printing electrode 11 is facing the display substrate 14 are moved toward the non-display substrate 16 by the action of the electric field. Further, the negatively charged white particles 20 present on the non-display substrate 16 are moved toward the display substrate 14 by the action of the electric field. Accordingly, since only the white particles 20 appear on the display substrate 14, the image is not displayed on the portion corresponding to the non-image portion.

On the other hand, unless the DC voltage is applied to the electrode 15, the positively charged black particles 18 present on the portion where the printing electrode 11 is facing the display substrate 14 remain on the display substrate 14 by the action of the electric field. Further, the positively charged black particles 20 present on the non-display substrate 16 are moved toward the display substrate 14 by the action of the electric field. Accordingly, since only the black particles 20 appear on the display substrate 14, the image is displayed on the position corresponding to the image portion.

In this manner, the black particles 18 and the white particles 20 are moved according to the image, and the image is displayed on the display substrate 14. Unless the white particles 20 are charged, only the black particles 18 are moved by the action of the electric field. The black particles 18 in a portion where the image is not displayed are moved to the non-display substrate 16. The image can be displayed from the display substrate 14 because it is concealed by the white particles 20. Even after the electric field generated between the substrates of the image display medium 10 is lost, the image displayed is maintained by the adhesion inherent in the particles. Further, since these particles can be moved again through the generation of the electric field between the substrates, the image can repetitively be displayed by the image-forming apparatus 12.

Thus, since the charged particles are moved by the electric field using air as a medium, the safety is high. Moreover, since air has a low viscosity resistance, the high-speed response can also be satisfied.

Figure 8:
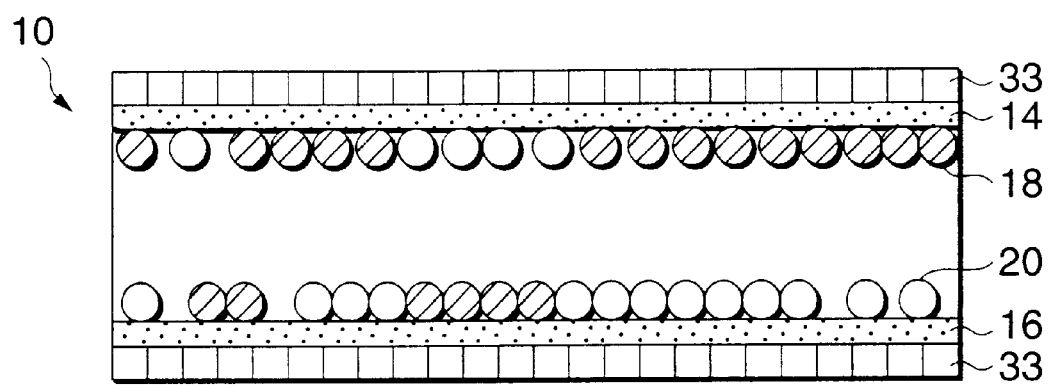
FIG. 8 is a schematic view of a matrix electrode.
Figure 9:
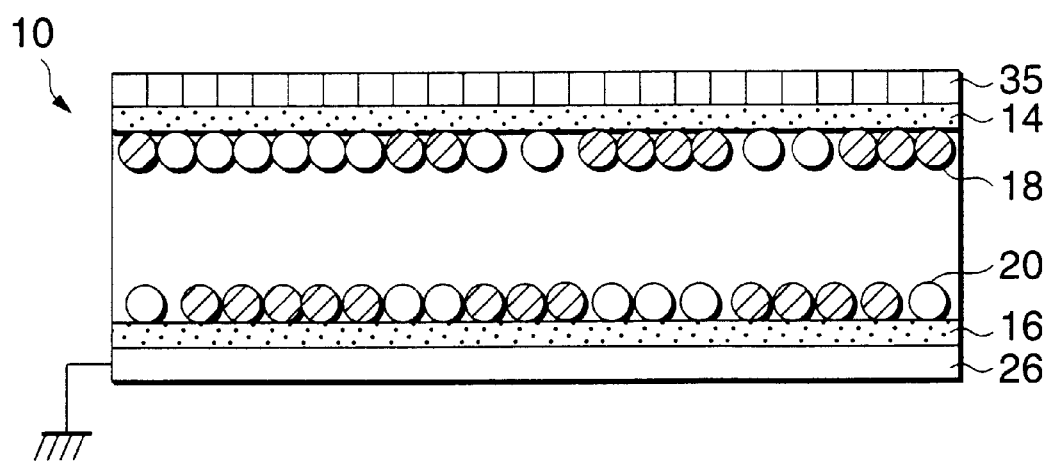
FIG. 9 is a schematic view of a pixel electrode.

It is also possible that the voltage is applied with a matrix electrode 33 as shown in FIG. 8 instead of the printing electrode 11 or with a pixel electrode 35 as shown in FIG. 9 (so-called active matrix driving).

Sixth Embodiment

The sixth embodiment is described below by referring to the drawings.

Figure 10:
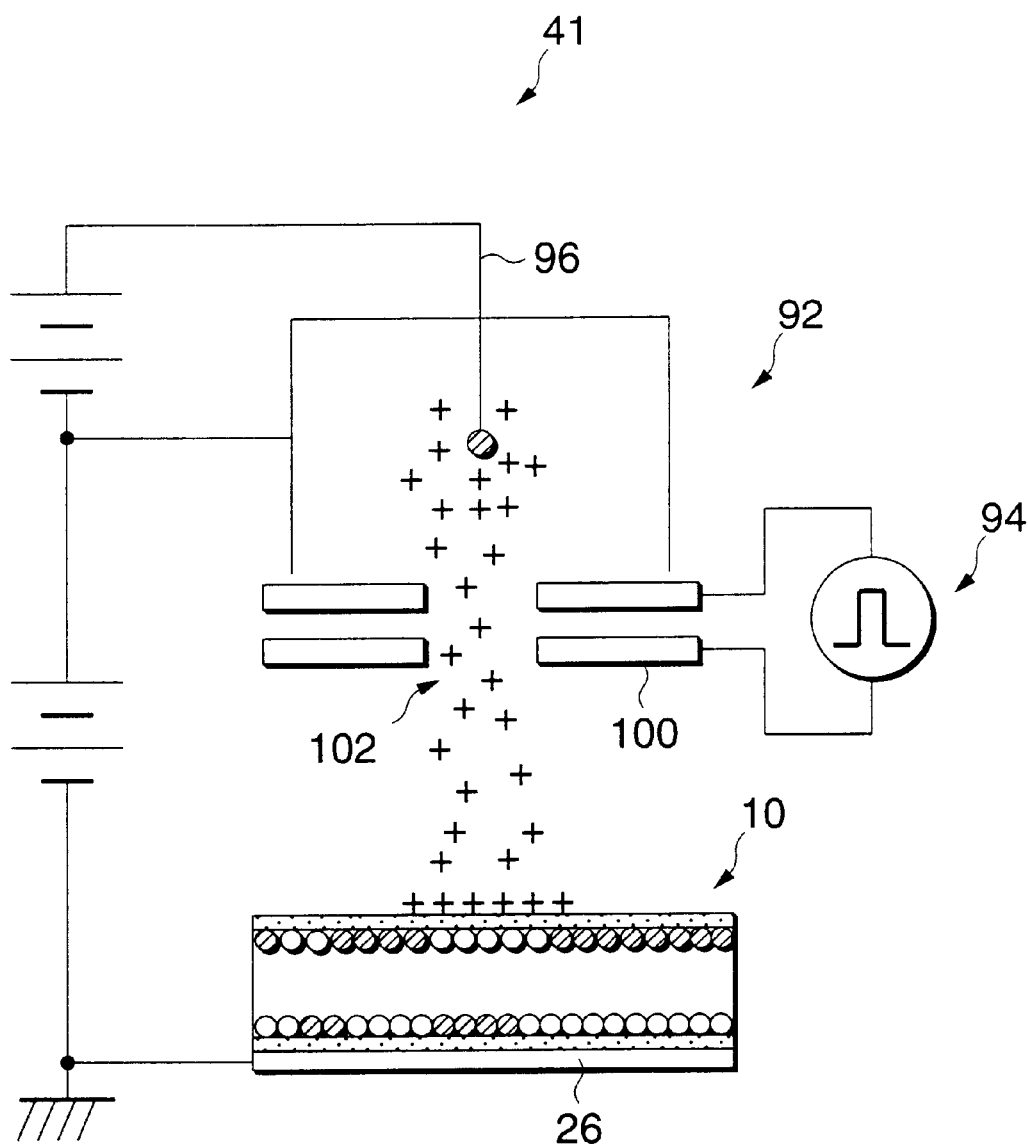
FIG. 10 is a schematic view of an ion irradiation head.

In the sixth embodiment, the case of using an ion irradiation head 41 shown in FIG. 10 is described.

In the ion irradiation head 41, aerial ions generated in a position spaced apart from the image display medium 10 are irradiated on the image display medium 10 according to the image information. As shown in FIG. 10, the ion irradiation head 41 is constructed of an aerial ion-generating portion 92 and an ion stream control portion 94. The aerial ion-generating portion 92 generates aerial ions by applying a high voltage to an electrode wire 96, as shown in, for example, FIG. 10, and causing corona discharge between it and a shield member 98. Further, the ion stream control portion 94 has control electrodes 100 mounted separately in a recording width direction with a desired resolution, and an opening 102 for irradiating ions generated in the aerial ion-generating portion onto the image display medium 10. The passage of the ions generated through the opening 102 is controlled with the polarity of the applied voltage to the control electrode 100.

The ion stream control portion 94 is mounted facing the image display medium 10, and the ions passed through the opening 102 are adhered to the image display medium 10 according to the electric field formed between the ion irradiation head 41 and the counter electrode 26. To each control electrode 100, the voltage is applied according to the image information, and the image is formed on the image display medium 10.

Figure 11:
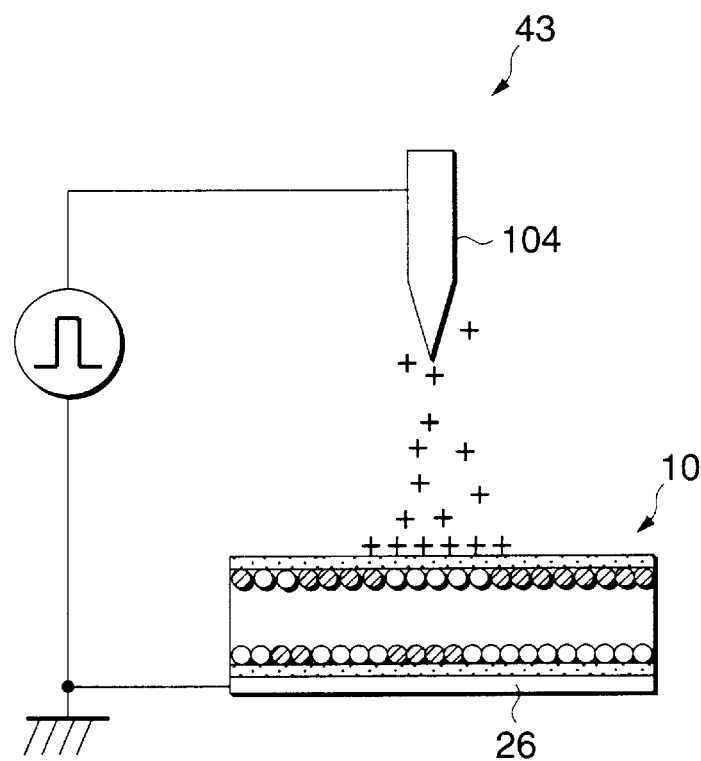
FIG. 11 is a schematic view of a stylus electrode.

A stylus electrode 43 shown in FIG. 11 may be used. In the stylus electrode 43, a large number of needle electrodes are arrayed to obtain a desired image resolution. In the stylus electrode 39, as shown in FIG. 11, the needle electrode 104 is mounted in the vicinity of the image display medium 10, and a high voltage is applied between it and the counter electrode 26 according to the image signal. Then, a high electric field acts on the tip of the needle electrode 104 in particular where the corona charge is generated. The corona charge generated is adhered to the image display medium 10 by the electric field formed between the needle electrode 104 and the counter electrode 26, whereby the image is formed on the image display medium 10.

Seventh Embodiment

The seventh embodiment is described below by referring to the drawing.

Figure 12:
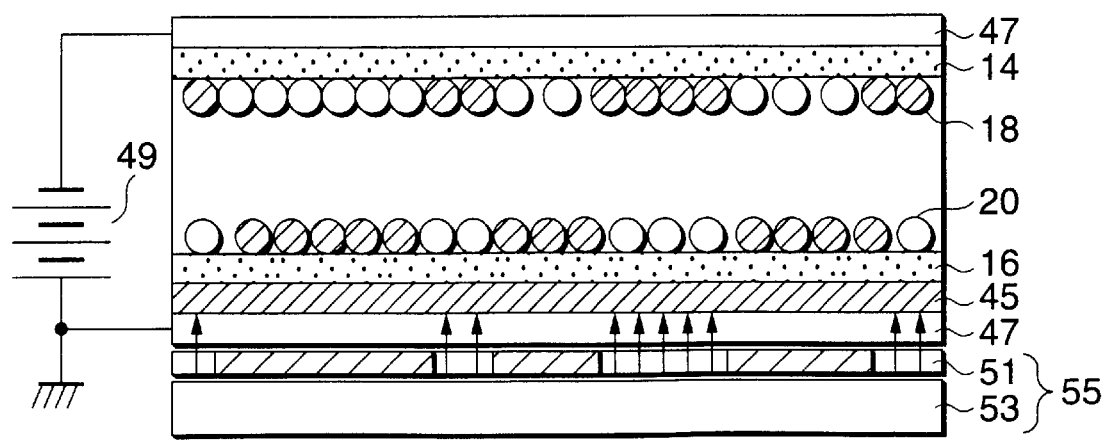
FIG. 12 is a schematic view of an exposure device.

In the seventh embodiment, as shown in FIG. 12, a photoconductive layer 45 showing a conductivity by applying light is laminated on the outside of at least one of the substrates, for example, the non-display substrate 16, and a substrate 47 with an electrode to which a uniform voltage can be applied is further formed thereon. While a uniform voltage is applied to the substrate 47 with the electrode by a DC power supply 49, image exposure based on image signals is conducted with an exposure device 55 constructed of a liquid crystal transparent panel 51 and a plate power supply 53 to give an electric field having a distribution according to this pattern. Before conducting the image formation by the light exposure, the respective particles are moved to either of the substrates (initialization) corresponding to colors.

When this construction is used, the photoconductive layer 45 acts substantially as a dielectric layer in the non-exposure state and almost as a conductive layer in the exposure state. Accordingly, with respect to a uniform DC voltage applied from the power supply 49, a voltage value is determined such that a voltage acting between the substrates reaches a level less than a level capable of moving the particles by a voltage applied to the photoconductive layer 47 in the non-exposure region and a voltage applied almost completely acts between the substrates in the exposure region and reaches the level capable of moving the particles. This construction has a peculiar effect that the image display with the high resolution can be conducted without the need of fine electrode processing. The photoconductive layer 47 can be produced, like an organic photoconductive layer used in a general electrophotographic photoreceptor, by dip-coating a tetrahydrofuran solution of a solid component containing a triphenylamine hole-transferring material Ae-18 and a binder of a polycarbonate (PC-Z) at a ratio of 1:1 as a charge-transferring layer and then dip-coating a dispersion of aluminum chloride phthalocyanine in a VMCH (vinyl chloride/vinyl acetate copolymer) resin/n-butyl acetate solution as a charge-generating material. This laminating order may be reversed. Other examples of the organic charge-generating material constituting the photoconductive layer 47 include pigments and dyes such as an azo pigment, a quinone pigment, a perylene pigment, an indigo pigment, a thioindigo pigment, a bisbenzoimidazole pigment, a phthalocyanine pigment, a quinacridone pigment, a quinoline pigment, a lake pigment, an azo lake pigment, an anthraquinone pigment, an oxazine pigment, a dioxazine pigment, a triphenylmethane pigment, an azulenium dye, a squalium dye, a pyrylium dye, a triallylmethane dye, a xanthene dye, a thiazine dye and a cyanin dye. Examples of the charge-transferring material can include hole-transferring materials, for example, low-molecular compounds such as pyrene, carbazole, hydrazone, oxazole, oxadiazole, pyrazoline, arylamine, arylmethane, benzidine, thiazole, stilbene and butadiene compounds, and highmolecular compounds such as poly-N-vinylcarbazole, halogenated poly-N-vinylcarbazole, polyvinylpyrene, polyvinylanthracene, polyvinylacridine, a pyrene-formaldehyde resin, an ethylcarbazole-formaldehyde resin, an ethylcarbazole-formaldehyde resin, a triphenylmethane polymer and polysilane; and electron-transferring materials such as benzoquinone, tetracyanoethylene, tetracyanoquinodimethane, fluorenone, xanthone, phenanthraquinone, phthalic anhydride and diphenoquinone. Besides the organic photoconductive materials, inorganic materials can be used. Examples thereof include amorphous silicon, amorphous selenium, tellurium, a selenium-tellurium alloy, cadmium sulfide, antimony sulfide, titanium oxide, zinc oxide and zinc sulfide.

In the exposure device 55, the liquid crystal transparent panel 51 mounted on a plate light source 53 (Color Illuminator Pro ST manufactured by Fuji Color) is used. This exposure device 55 is closely adhered to the image display medium 10, and a voltage is applied while the photoconductive layer 47 of the image display medium 10 is directly irradiated with light passed through the liquid crystal transparent panel 51, whereby the image of the same pattern as that of the liquid crystal transparent panel 51 is formed on the surface of the image display medium 10.

With respect to the exposure device 55, a combination of a surface emitting device such as CRT and a fiber optical system or an image-forming optical system, a one-dimensional or two-dimensional optical writing device in which fluorescent display tubes, plasma emitting elements, EL emitting elements or LED emitting elements are arranged in line or surface form, or a method in which scanning is conducted with a laser beam source using an optical scanning system one-dimensionally or two-dimensionally can be used. Further, transmitted light obtained by passing light emitted from a fluorescent lamp or a halogen lamp through a transparent film such as an OHP film or reflected light given by reflecting a reflective object may directly be applied to the photoconductive layer 47 or an image may be formed using an image formation optical system.

Eighth Embodiment

The eighth embodiment is described below by referring to the drawings.

Figure 13:
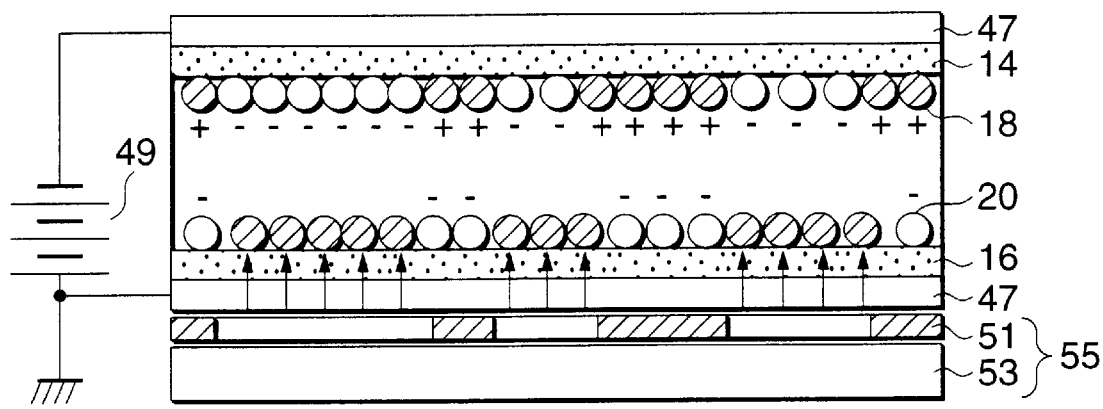
FIG. 13 is another schematic view of an exposure device.

In the eighth embodiment, as shown in FIG. 13, a photoconductive material showing a conductivity by applying light is contained in the charged black particles 18, and the particles in a region according to an image exposure pattern are selectively rendered in a uncharged state. The charged particles in the substrates are moved according to the uniform electric field between the substrates.

The photoconductive particles containing the photoconductive material can be produced as follows. First, 100 parts by weight of a polyester resin, 5 parts by weight of gallium chloride phthalocyanine, 20 parts by weight of triphenylamine and 110 parts by weight of ethyl acetate are dispersed with a ball mill for 48 hours to form solution A. Meanwhile, 100 parts by weight of a carboxymethylcellulose 2% aqueous solution is prepared as solution B. Subsequently, 100 parts by weight of solution B is stirred with an emulsifier, and 50 parts by weight of solution A is slowly charged therein to form a suspension. Thereafter, ethyl acetate is removed under reduced pressure, and the residue is washed with water, dried, and classified to form blue photoconductive particles.

Formation of an image on the image display medium 10 using the thus-obtained photoconductive particles is described below. The photoconductive particles 18 and the insulating particles 20 having a different color (white here) are previously charged by stirring and impinging the same in a non-exposure state by the charging method with the alternating field as shown in FIG. 5. At this time, the photoconductive particles 18 are positively charged. Then, the exposure is conducted with the exposure device 55 shown in FIG. 13. The display pattern of the liquid display transparent panel 51 in the exposure device 55 is provided by inverting the display pattern of the liquid crystal transparent panel 51 in the exposure device 55 shown in FIG. 12 in the negative state. This is because the particles in the exposure region are not moved by using the phenomenon that electron and hole carriers are generated in the photoconductive particles 18 of the light-irradiated region, the positive surface charge due to the charging is offset with the electrons generated by the exposure and the uncharged state is given after the completion of the exposure.

As the substrate of the image display medium 10, a glass substrate and a flexible plastic substrate can be used. It is advisable to use a plastic material because it is excellent in flexibility close to that of paper hard copy and mechanical strengths capable of withstanding rough handling. Examples of such a material of the plastic substrate include polyester films such as polyethylene terephthalate, polycarbonates and polyimides.

Figure 14:
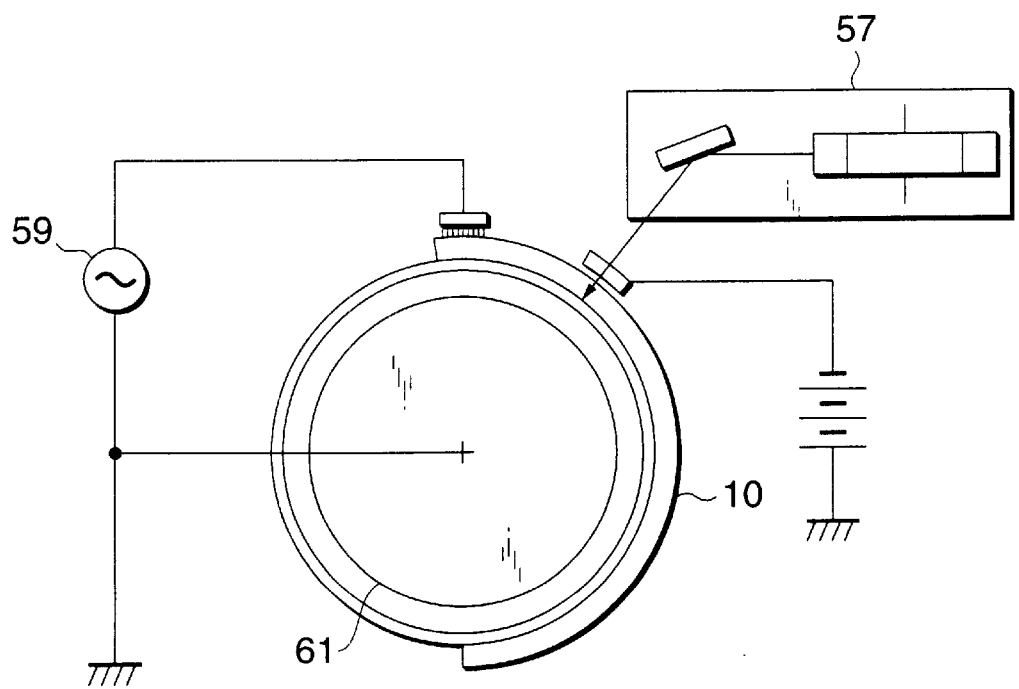
FIG. 14 is a view describing image formation by a light beam scanner.

As shown in FIG. 14, the exposure may be conducted using a laser scanning exposure device 57 used in an electrophotographic apparatus as the exposure device 55. In this case, the image can be formed on the image display medium 10 by winding the same on a drum 61 such that a surface facing the display surface of the image display medium 10 having the flexible substrate is an outer surface and conducting two-dimensional exposure through the laser exposure and the rotation of the drum 61 while a DC voltage is applied to the image display medium 10 with a DC power supply 59. The initialization is conducted before the image exposure.

Ninth Embodiment

The ninth embodiment is described below by referring to the drawings.

Figure 15:
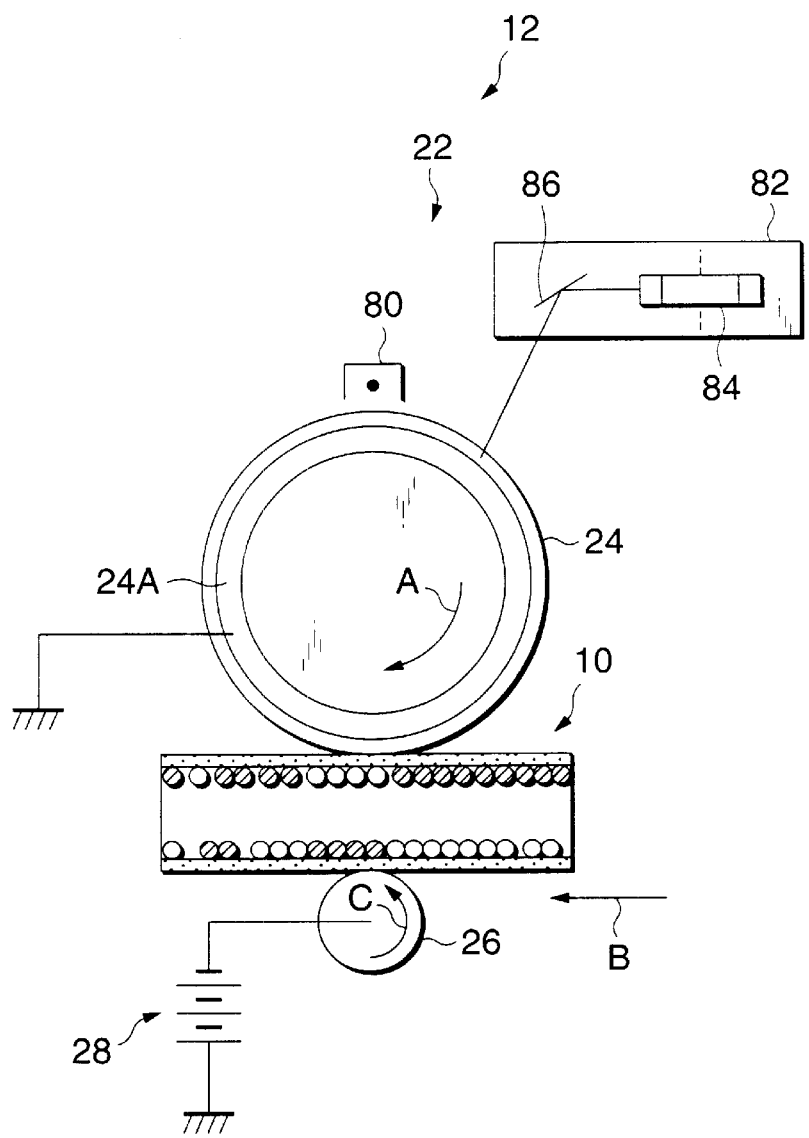
FIG. 15 is a schematic view of an image-forming apparatus according to the ninth embodiment.

FIG. 15 shows the image-forming apparatus 12 in the ninth embodiment. The image-forming apparatus 12 has an electrostatic latent image-forming portion 22, a drum-like electrostatic latent image carrier 24, a counter electrode 26 and a DC voltage power supply 28.

The electrostatic latent image-forming portion 22 has a charging device 80 and a light beam scanner 82. In this case, a photoreceptor drum 24 can be used as the electrostatic latent image carrier 24. In the photoreceptor drum 24, a photoconductive layer is formed on a drum-like conductive substrate of aluminum or SUS. Various known materials can be used in the photoconductive layer. For example, inorganic photoconductive materials such as $\alpha$-Si, $\alpha$-Se and $As_2Se_3$ and organic photoconductive materials such as PVK/TNF can be used. These can be formed by plasma CVD, a deposition method or a dipping method. Further, a charge transfer layer or an overcoat layer may be formed as required.

A charging device 80 uniformly charges the surface of the electrostatic latent image carrier 24 at a predetermined voltage. The charging device 80 may be one which can charge the surface of the photoreceptor drum 24 at an optional voltage. In this embodiment, a corotron is used in which a high voltage is applied to an electrode wire to generate corona discharge between it and the electrostatic latent image carrier 24 and uniformly charge the surface of the photoreceptor drum 24. Other various known charging units can also be used. For example, a conductive roll member, a brush or a film member is contacted with the photoreceptor drum 24, and a voltage is applied thereto to charge the surface of the photoreceptor drum.

In the light beam scanner 82, micro-spotlight is applied to the surface of the charged electrostatic latent image carrier 24 based on image signals to form an electrostatic latent image on the electrostatic latent image carrier 24. The light beam scanner 82 may be a device in which light beam is applied to the surface of the photoreceptor drum 24 according to the image information to form the electrostatic latent image on the uniformly charged photoreceptor drum 24. In this embodiment, it is a ROS (Raster Output Scanner) in which the surface of the photoreceptor drum 24 is scanned with light through a polygon mirror 84 in an image formation optical system having the polygon mirror 84, a return mirror 86 and a light source and a lens not shown while laser beam adjusted to a predetermined spot diameter is turned on or off according to the image signal. Further, a LED head in which LED's are arranged according to desired resolution is also available.

A conductive support 24A of the electrostatic latent image carrier 24 is earthed. Further, the electrostatic latent image carrier 24 is turned in the arrow A direction.

The counter electrode 26 is constructed of, for example, an elastic conductive roll member. Accordingly, it can closely be adhered to the image display medium 10. Further, the counter electrode 26 is mounted facing the electrostatic latent image carrier 24 such that the image display medium 10 transported in the arrow B direction by a transporting unit not shown is held therebetween. The counter electrode 26 is connected to the DC voltage power supply 28. A bias voltage $V_B$ is applied to the counter electrode 26 by this DC voltage power supply 28. The bias voltage $V_B$ to be applied is, as shown in, for example, FIG. 2, a voltage that reaches an intermediate potential between a potential $V_H$ of a positively charged portion of the electrostatic latent image carrier 24 and a potential $V_L$ of an uncharged portion. Moreover, the counter electrode 26 is turned in the arrow C direction in FIG. 12.

The function of the ninth embodiment is described.

When the electrostatic latent image carrier 24 starts turning in the arrow A direction in FIG. 15, the electrostatic latent image is formed on the electrostatic latent image carrier 24 by the electrostatic latent image-forming portion 22.

Meanwhile, the image display medium 10 is transported in the arrow B direction by the transporting unit not shown, and sent between the electrostatic latent image carrier 24 and the counter electrode 26.

Figure 16:
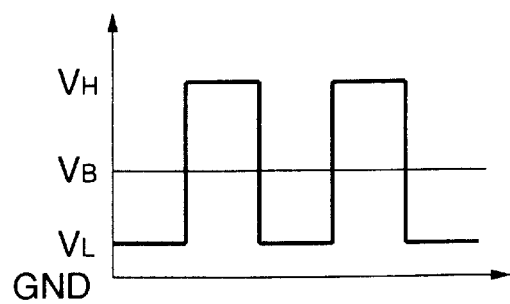
FIG. 16 is a view showing a potential in an electrostatic latent image carrier and a counter electrode.

Here, the bias voltage $V_B$ shown in FIG. 16 is applied to the counter electrode 26, and the potential of the electrostatic latent image carrier 24 facing the counter electrode 26 is VH. Accordingly, when the portion of the electrostatic latent image carrier 24 which is facing the display substrate 14 is positively charged (non-image portion) and the black particles 18 are adhered to the portion of the display substrate 14 which is facing the electrostatic latent image carrier 24, the positively charged black particles 18 are moved from the display substrate 14 to the non-display substrate 16, and adhered to the non-display substrate 16. Consequently, the insulating white particles 20 alone appear on the display substrate 14, so that the image is not displayed on the portion corresponding to the non-image portion.

On the other hand, when the portion of the electrostatic latent image carrier 24 which is facing the display substrate 14 is not positively charged (image portion) and the black particles 18 are adhered to the portion of the non-display substrate 16 which is facing the counter electrode 26, the potential of the electrostatic latent image carrier 24 in the position facing the counter electrode 26 is $V_L$. Thus, the charged black particles 18 are moved from the non-display substrate 16 to the display substrate 14, and adhered to the display substrate 14. Consequently, since only the black particles 18 appear on the display substrate 14, the image is displayed on the portion corresponding to the image portion.

In this manner, the black particles 18 are moved according to the image, and the image is displayed on the display substrate 14. Even after the electric field generated between the substrates of the image display medium 10 is lost, the image displayed by the adhesion inherent in the particles and the image force between the particles and the substrates is maintained. Further, when the electric field is generated between the substrates, the black particles 18 and the white particles 20 can be moved again. Therefore, the image can repetitively be displayed by the image-forming apparatus 12.

Thus, the bias voltage is applied to the counter electrode 26, so that the black particles 18 can be moved even when the black particles 18 are adhered to either the display substrate 14 or the non-display substrate 16. Accordingly, there is no need to previously adhere the black particles 18 to one substrate. Further, the image with the high contrast and the high sharpness can be formed. Still further, since the charged particles are moved by the electric field using air as a medium, the safety is high. Furthermore, since air has a low viscosity resistance, the high-speed response can be satisfied.

Figure 17:
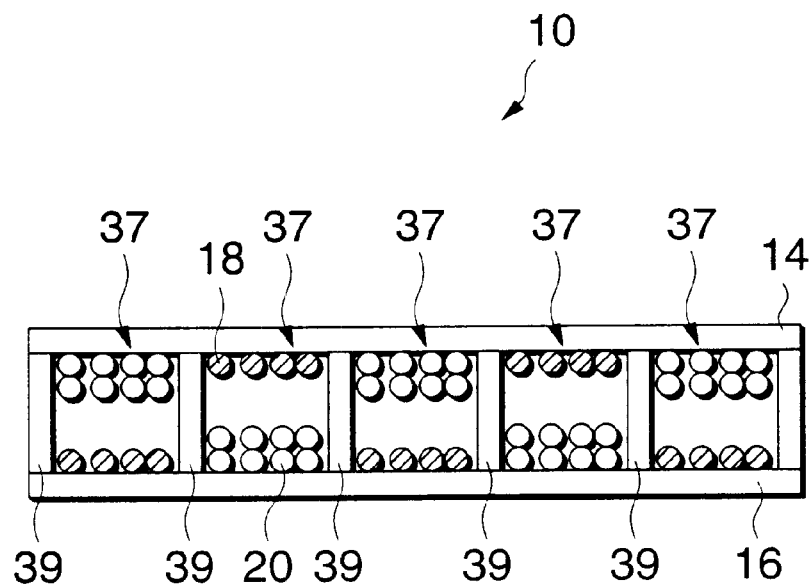
FIG. 17 is a view showing another example of the image display medium.

In the construction of the image display medium 10, it is also possible that as shown in, for example, FIG. 17, a space between the opposite substrates of the image display medium 10 has a cell structure in which the particles are encapsulated in each cell 37. Consequently, partial imbalance of the particles contained between the substrates can be suppressed to conduct image display more safely. Further, since the gap between the opposite substrates is constantly controlled by cell walls 39, the image display with the electrostatic force can be conducted more safely. Moreover, it does not occur that when the pressure is applied to the image display medium 10, the image display medium 10 is collapsed and the particles contained are agglomerated to stop the movement of the particles by the electrostatic force. Thus, the defective display owing to this can be prevented.

The image display medium 10 having the cell structure can be formed by forming a cell pattern of an optional size on at least one of the substrates through etching treatment, laser processing, or press working or printing with a mold produced previously, encapsulating desired particles in each cell and bonding the opposite substrate thereon.

The image display medium 10 having the cell structure can be formed by holding a sheet having a large number of openings between the display substrate and the non-display substrate, encapsulating the desired particles in each cell and bonding the opposite substrate thereon. As the sheet having the large number of openings, there is, for example, a net. The net is easily obtained, inexpensive, and relatively uniform in thickness. Thus, the net is effective when the display medium is produced at low cost. This method is for a large-sized display apparatus which does not require resolution so much, not for a display medium contributed to fine display. Further, as another example of the sheet having the large number of openings, there is a sheet in which holes are formed by etching or laser processing. In this case, the thickness of the sheet and the form of the hole can freely be selected as compared with the net. Accordingly, this is a display medium for conducting fine display, and effective for more increasing the contrast.

Figure 18:
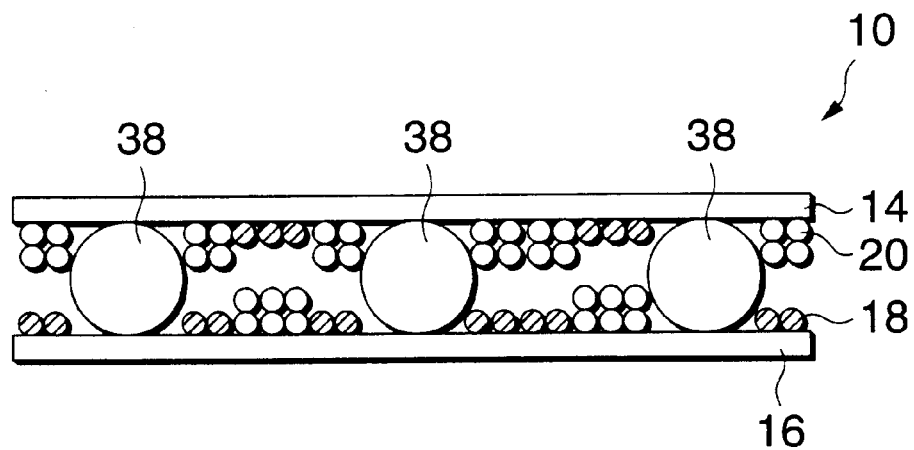
FIG. 18 is a view showing another example of the image display medium.

Besides the cell structure, the gap between the opposite substrates can be controlled by interposing spacer particles 38 having the same size as the desired gap as shown in FIG. 18. This method has no function to prevent partial imbalance of the particles, but it can provide the image display medium 10 much more easily and inexpensively than the formation of the cell structure. As the spacer particles, transparent particles that less influence the display image can preferably be used. For example, glass particles and polystyrene, polyester or acrylic transparent resin particles are available.

In this embodiment, the case in which the black particles 18 are not uniformly adhered to the display surface 14 in advance has been described. However, this is not critical, and the particles may uniformly be adhered to the display surface 14 in advance by the initializer 40.

Moreover, in this embodiment, the description has been made on condition that the positively charged portion of the electrostatic latent image carrier 24 is the non-image portion and the uncharged portion is the image portion. However, this is not critical. The image formation may be conducted by combining, as required, the polarity of the charge, the polarities of the image portion and the non-image portion and the polarities of the particles. For example, it is also possible that the positively charged portion of the electrostatic latent image carrier 24 is the image portion, the uncharged portion is the non-image portion, the black particles 18 are negatively charged and the white particles 20 are positively charged.

Tenth Embodiment

The tenth embodiment is described below by referring to the drawings. In the tenth embodiment, an image-forming apparatus which can form the image on the image display medium 10 capable of repetitive use and also on ordinary recording paper is described.

Figure 19:
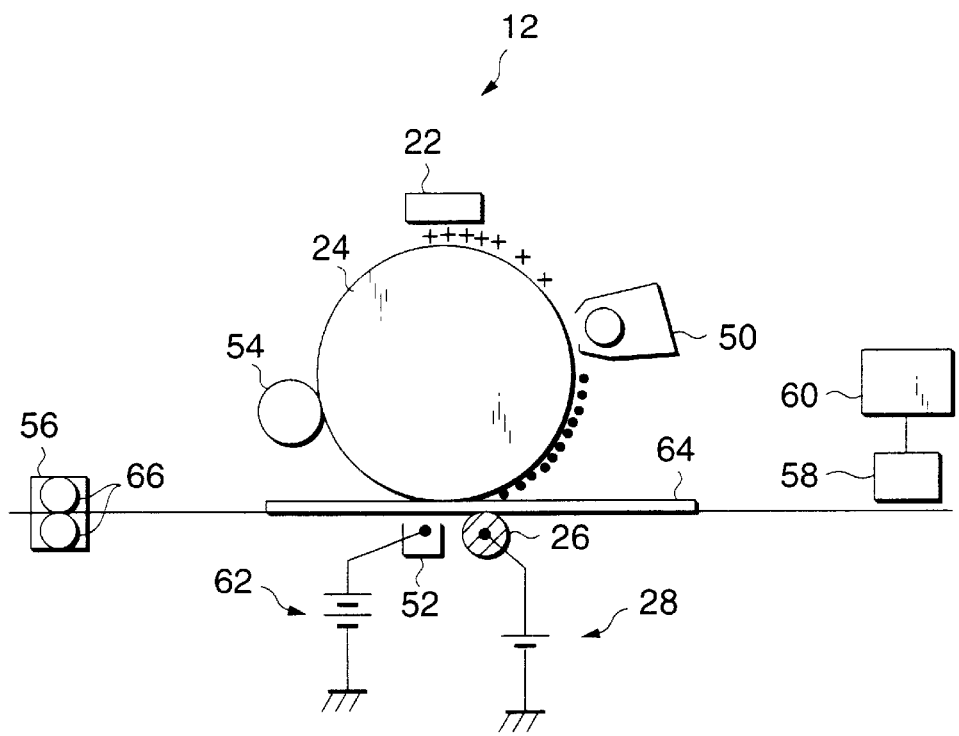
FIG. 19 is a schematic view of an image-forming apparatus according to the tenth embodiment.

FIG. 19 shows the image-forming apparatus 12 which can form the image on the image display medium 10 and also on ordinary recording paper. By the way, the same portions as in the image-forming apparatus 12 described in the fourth embodiment are given the same numerals, and the detailed description thereof is omitted.

As shown in FIG. 19, the image-forming apparatus 12 has the developing device 50, the transfer device 52, the cleaning device 54, the fixing device 56, the medium detecting sensor 58 and the control portion 60.

In the developing device 50, the electrostatic latent image formed on the electrostatic latent image carrier 24 is developed with a toner by the electrostatic latent image-forming portion 22. The image formation of the toner image can be conducted by a method which is generally used in electrophotography. For example, any of a magnetic one-component development method, a non-magnetic one-component development method and a two-component development method using a contact or non-contact developing roll may be employed.

The transfer device 52 is contacted to the DC voltage power supply 62. This transfer device 52 transfers the toner image formed on the electrostatic latent image carrier 24 onto recording paper 64 by applying the voltage from the DC voltage power supply 62. As a transfer member, any member that conducts transfer by the electric field, such as a corotron or a roll, may be used.

Figure 20:
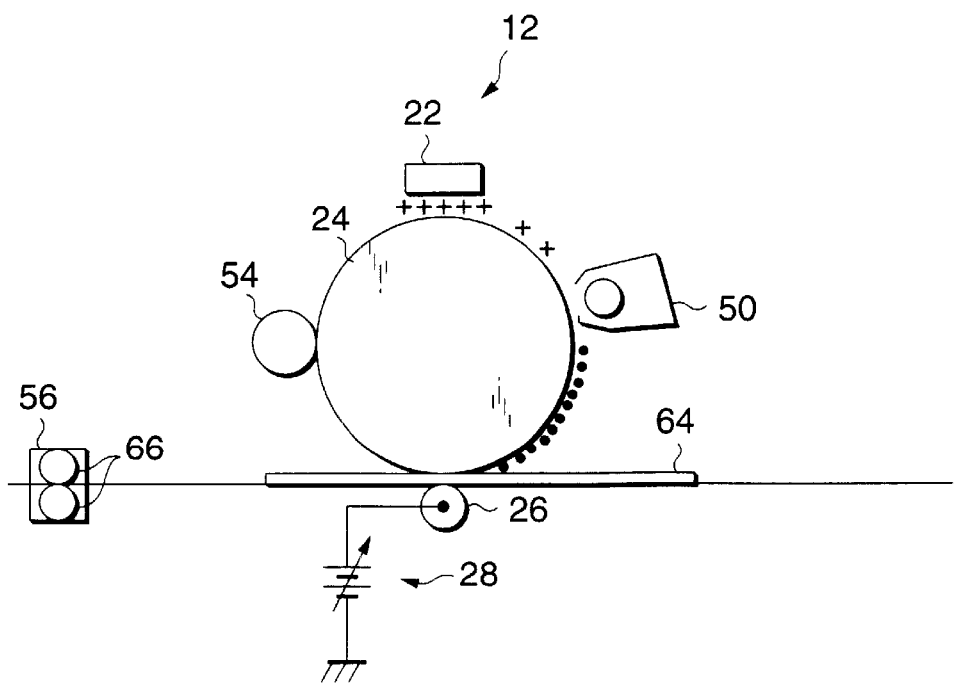
FIG. 20 is a modification example of the image-forming apparatus according to the tenth embodiment.

Since the transfer of the toner image onto the recording paper 64 and the image formation on the image display medium 10 are both conducted by applying the voltage, the counter electrode 26 may be used in common as the transfer device 52 as shown in FIG. 20. In this case, the DC voltage power supply 28 may be used as a power supply capable of controlling the applied voltage.

The cleaning device 54 removes the toner remaining on the electrostatic latent image carrier 24 after the transfer. As the cleaning member, a brush, a roll or a blade can be used.

The fixing device 56 has a pair of fixing rollers 66 which can be heated at a predetermined temperature. The toner image on the recording paper 64 can be heat-fixed such that the recording paper 64 is transported with the fixing rollers 66 heated by being held therebetween. Further, not only the roller but also a belt is available, and not only the heat-fixing but also the pressure-fixing may be conducted.

Figure 21:
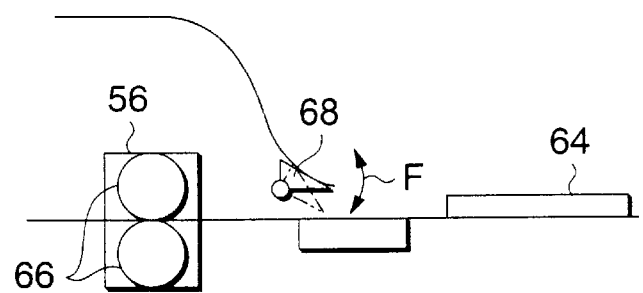
FIG. 21 is a schematic view of a fixing device and a transport route change-over member.

In the image-forming apparatus 12, as shown in FIG. 21, though not shown in FIG. 19, a transport route change-over member 68 is disposed before the fixing device 56 on the medium transport route. This transport route change-over member 68 is turned in the arrow F direction according to instructions from the control portion 60 to change the transport route of the medium. When a medium is the recording paper 64, the tip of the transport route change-over member 68 is raised upward as shown in FIG. 21 according to instructions from the control portion 60, whereby the recording paper 64 is transported toward the fixing device 56. Meanwhile, when the medium is the image display medium 10, the tip is lowered downward as shown by a broken line according to instructions from the control portion 60, whereby the image display medium 10 is transported upward without being passed through the fixing device 56.

Figure 22:
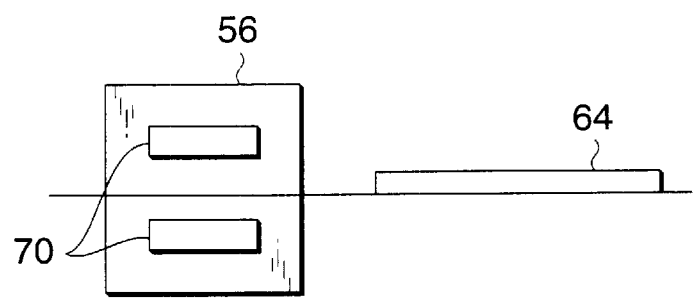
FIG. 22 is a view showing a fixing unit.

It is also possible that the transport route change-over member 68 is not provided but a pair of hot wires 70 which are not contacted with the recording paper 64 and which can change over the heating at high speed are used in the fixing device 56 as shown in FIG. 22. Consequently, when a medium to be transported is the recording paper 64, the hot wires 70 are heated to conduct the fixing treatment, and when the medium is the image display medium 10, the heating of the hot wires 70 is not conducted. Accordingly, the recording paper 64 and the image display medium 10 can be treated with the same transport route.

Figure 23:
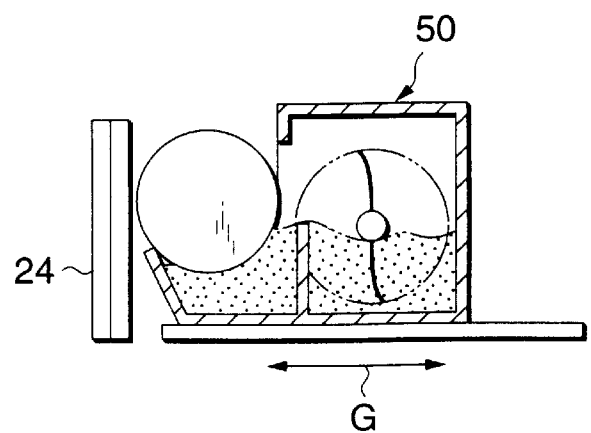
FIG. 23 is a view showing another example of the developing device.
Figure 24:
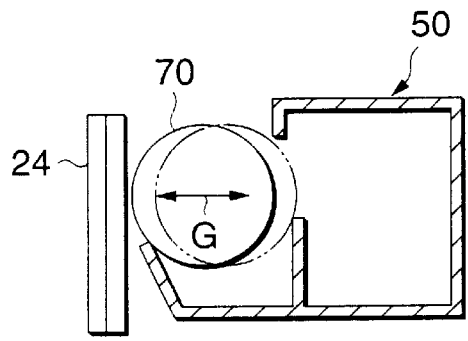
FIG. 24 is a view showing another example of the developing device.

The developing device 50 can be moved, as shown in FIG. 23, in the arrow G direction by instructions from the control portion 60 such that it is separated from, or contacted with, the electrostatic latent image carrier 24. Consequently, in case of conducting the image formation of the image display medium 10 after the image formation onto the recording paper 64, the developing device 50 is separated from the electrostatic latent image carrier 24, and the toner is thus not supplied to the electrostatic latent image carrier 24. Accordingly, the toner can be prevented from being adhered to the image display medium 10. Incidentally, it is also possible to move the developing roll 70 alone (to a position shown by a broken line) as shown in FIG. 24 without moving the whole developing device 50.

Figure 25:
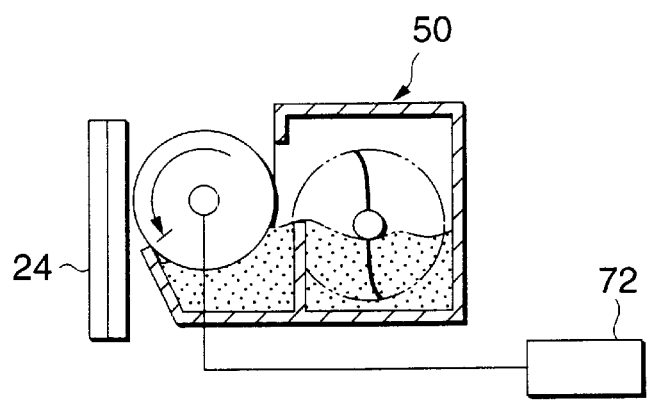
FIG. 25 is a view showing another example of the developing device.
Figure 26:
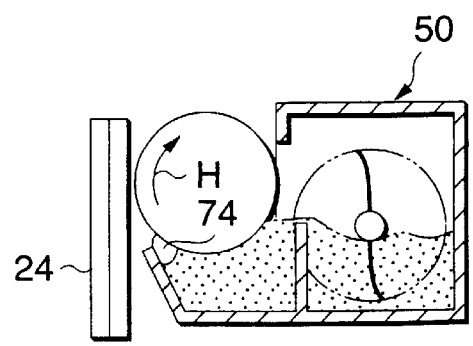
FIG. 26 is a view showing another example of the developing device.
Figure 27:
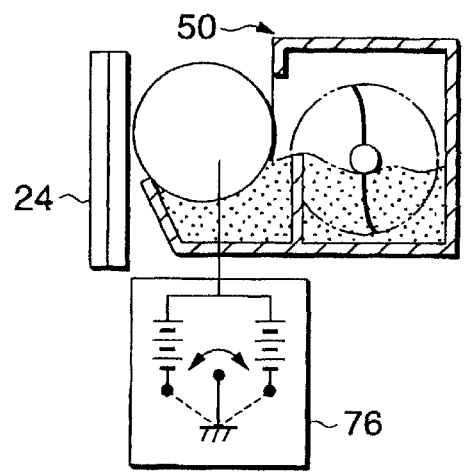
FIG. 27 is a view showing another example of the developing device.

Further, the supply of the toner to the electrostatic latent image carrier 24 may be prevented such that the driving of the developing roll 70 is stopped by a driving device 72 according to instructions from the control portion 60 as shown in FIG. 25, or the developing roll 70 is reversely rotated (in the arrow H direction) and a stop member 74 stops the supply of the toner to the developing roll as shown in FIG. 26, or a voltage of a polarity opposite to a potential of an electrostatic latent image is applied to the developing roll 70 using a voltage-applying device 76 capable of changing over a polarity of a voltage applied as shown in FIG. 27.

A medium-detecting sensor 58 is connected to the control portion 60. In the medium-detecting sensor 58, light reflected by applying predetermined light (for example, infrared light) to, for example, a medium being passed is detected, and an amount of reflected light detected is measured, and outputted to the control portion 60. Further, it is also possible to detect a weight of a medium being passed and output the same to the control portion 60.

In the control portion 60, it is judged whether the medium of forming the image is the image display medium 10 or the recording paper 64 based on the detected result outputted from the medium-detecting sensor 58. Further, the control portion 60 determines the control parameter of each portion according to the medium, controlling each portion according to the control parameter. This control parameter includes, for example, an image-forming parameter, an electric field-generating parameter, an information as to whether the developing device 50 is used or not, an information as to whether the fixing device 56 is used or not, and a medium transport route.

Figure 28:
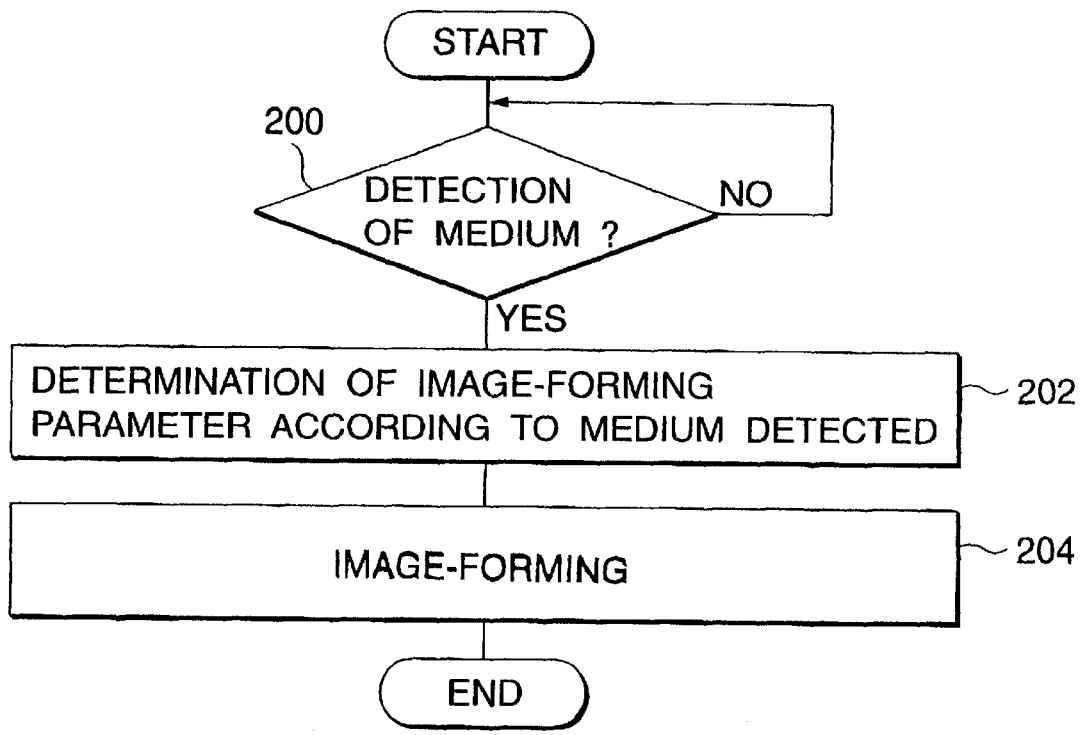
FIG. 28 is a flowchart of a control routine which is carried out in a control portion.

With respect to the function of the tenth embodiment, a control routine which is practiced in the control portion 60 is described by referring to FIG. 28.

In a step 200 shown in FIG. 28, it is judged whether the medium is detected with the medium-detecting sensor 58. In the medium-detecting sensor 58, light reflected by applying predetermined light (for example, infrared light) to, for example, a medium being passed is detected, and an amount of reflected light detected is measured, and outputted to the control portion 60.

When the medium is detected, it is accepted in the step 200. In a step 202, it is judged whether the medium to be transported is the image display medium 10 or the recording paper 64, according to the result detected by the medium-detecting sensor 58, namely, the amount of reflected light. On the basis of the result judged, the image-forming parameter is determined. This image-forming parameter includes, for example, an electric field-generating parameter, determination of the developing device, determination of the transport route, a rate of transportation and an exposure value.

The electric field-generating parameter is, for example, an applied voltage value in each portion. When the medium to be transported is the image display medium 10, it is an applied voltage value in each of the electrostatic latent image-forming portion 22, the developing device 50 and the counter electrode 26. When the medium to be transported is the recording paper 64, it is an applied voltage value in each of the electrostatic latent image-forming portion 22, the developing device 50, the transfer device 52 and the cleaning device 54.

With respect to the setting of the developing device, when the medium to be transported is, for example, the image display medium 10, the developing device 50 is, as shown in, for example, FIG. 23, moved in the arrow G direction to be spaced apart from the electrostatic latent image carrier 24. Further, when the medium is the recording paper 64, the developing device 50 is moved in the arrow G direction to be contacted with the electrostatic latent image carrier 24.

With respect to the determination of the transport route, when the medium to be transported is the image display medium 10, the transport route change-over member 68 is turned in the arrow F direction, as shown in FIG. 21, to direct the tip downward (position shown by a broken line). Consequently, the image display medium 10 can be transported upward without being passed through the fixing device 56 after the image formation. When the medium to be transported is the recording medium 64, the transport route change-over member 68 is turned in the arrow F direction to direct the tip upward. Consequently, the recording paper 64 can be transported toward the fixing device 56. In this case, the heating temperature of the fixing roller 66 is determined.

In a step 204, the image-forming treatment is conducted. That is, when the medium to be transported is the image display medium 10, as described in the third embodiment, the electrostatic latent image-forming portion 22 is controlled to form the electrostatic latent image on the electrostatic latent image carrier 24, and the bias voltage is applied to the counter electrode 26 to form the image on the image display medium 10. Further, when the medium to be transported is the recording medium 64, the electrostatic latent image-forming portion 22 is controlled to form the electrostatic latent image on the electrostatic latent image carrier 24, and the toner development is conducted with the developing device 50. The toner image is transferred onto the recording paper 64 by the transfer device 52, and the toner image transferred is fixed by the fixing device 56. Thus, the image is formed on the recording paper 64.

In this manner, the medium is automatically detected, and the image-forming treatment is conducted according to the medium detected, whereby the image formation of the image display medium 10 capable of repetitive use and the recording medium 64 can be conducted in one apparatus. Moreover, since the various parameters are determined according to each medium and the image formation is conducted according to the same, the image quality is not deteriorated.

In this embodiment, the case of automatically detecting the medium and forming the image according to the medium detected has been described. It is also possible that users manually input whether the medium is the image display medium or the image-recording medium through an inputting unit such as a keyboard or a mouse and the image formation is conducted according to the result inputted.

As another example of the electrostatic latent image-forming portion 22, the ion irradiation head 41 shown in FIG. 10 may be used. In this case, the dielectric drum 24 in which the dielectric layer is formed on the conductive substrate can be used as the electrostatic latent image carrier 24.

As still another example of the electrostatic latent image-forming portion 22, the stylus electrode 43 shown in FIG. 11 may be used. In this case, the dielectric drum 24 in which the dielectric layer is formed on the dielectric substrate can be used as the electrostatic latent image carrier 24.

Eleventh Embodiment

The eleventh embodiment is described below by referring to the drawings. In the eleventh embodiment, the formation of the color image on the image display medium is described.

Figure 29:
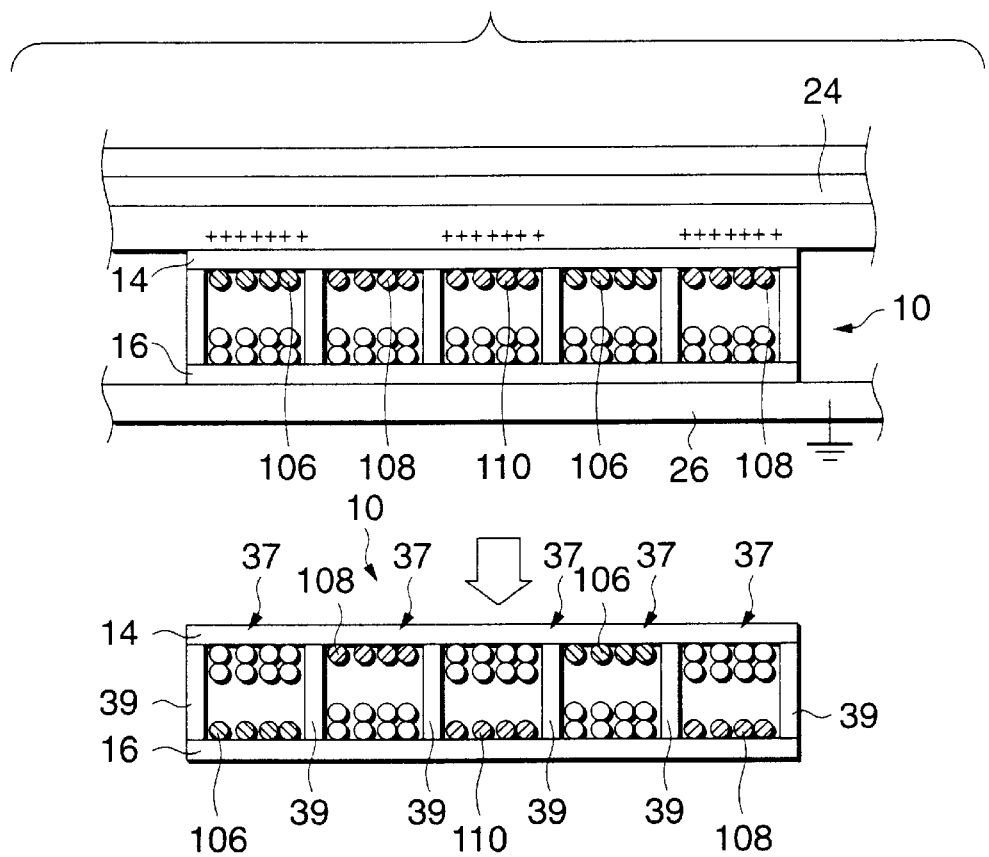
FIG. 29 is a view showing an image display medium capable of displaying a color image.

The image display medium 10, as shown in FIG. 29, for forming the color image is the image display medium 10 having the cell structure as shown in FIG. 9 in which color particles, yellow (6Y) particles 106, magenta (6M) particles 108 and cyan (6C) particles 110 are encapsulated in the respective cells 37 in a predetermined arrangement. This image display medium 10 is transported between the electrostatic latent image carrier 24 for carrying the electrostatic latent image formed on the basis of the image signal of each color and the counter electrode 26, and the color particles in each cell 37 are moved toward the display substrate 14 according to the electric field forming the electrostatic latent image. The white particles or the black particles may be encapsulated in each cell 37. Here, it is important that the position of the electrostatic latent image formed from the image signal of each color on the electrostatic latent image carrier 24 agrees with the position of the cell 37 having therein each color of the image display medium 10. With respect to the colors of the color particles, the color reproduction zone may be adjusted by adding red (R), green (G), blue (B) and black (K) as required.

Especially regarding black (K), instead of the movement of the charged particles by the electric field, the black display may be conducted by encapsulating the magnetic black particles in the cells 37 along with the other color particles and moving the same toward the display substrate 14 with a magnetic attractive force based on the image signal. At this time, the magnetic attractive force based on the image signal can be applied with, for example, a magnetic stylus.

The color particles in each cell 37 can be charged by the method described in the eighth embodiment before the step of conducting the image formation.

The image formation of the color image is basically the same as the treatment shown in the seventh embodiment. In this embodiment, the electrostatic latent images of the respective colors are once formed on the electrostatic latent image carrier 24 according to the color image signals. Consequently, the color particles encapsulated in the cells of the image display medium 10 are moved toward the display substrate 14 according to the electrostatic latent images of the respective colors. Thus, the color image can be formed by one image-forming step.

Here, in a tandem-type color printer, for example, images of the respective colors are formed on four photoreceptors, and transferred onto paper overlappingly four times. Accordingly, the pixel positioning of the colors on the paper is a great problem. Further, even in a 4-cycle-1-copy-type color printer, the images of the colors formed on one photoreceptor are transferred onto paper overlappingly four times. Thus, the same problem is posed. On the contrary, in the invention, the color image can be formed by moving the particles of the plural colors through one image-forming step. Thus, it is sufficient that the pixel position of the cell 37 on the image display medium 10 and the pixel position of the electrostatic latent image are matched only once. Further, the color image can be formed more easily at high speed.

The image display medium formed with the image display apparatus by the image display method can be used in various rewritable products having a memory property, such as a bulletin board, a circular notice, a poster, a sign board, a flashing signal, an electronic paper, an electronic newspaper, an electronic book and a temporary sheet capable of being used in a copier and a printer.

As has been stated above, according to the invention, the plural types of the particle groups contained between the pair of substrates to be movable by the electric field applied and which are different in color and charging properties are moved according to the image to form the image. Thus, there are the effects that the repetitive rewriting is enabled and the display image contrast, the safety and the response are excellent.

What is claimed is:

1. An image display medium comprising:
    a pair of substrates, and a space defined between them, with at least one of a gas disposed in the space and partial vacuum formed in the space; and
    plural types of particle groups contained between the substrates to be movable therebetween by an applied electric field, the plural types of particle groups being different in color and charging property.

2. The image display medium as claimed in claim 1, wherein at least two types of the particle groups are mutually moved in opposite directions by the applied electric field.

3. The image display medium as claimed in claim 1, wherein the filling rate of the plural types of the particle groups contained between the substrates is not less than 0.1% and not more than 50%.

4. The image display medium as claimed in claim 1, wherein when the average particle diameter of each particle group is 2r, the particles of the particle groups have an average amount of charge of not less than $\pm 5 \times (r^2/10^2)$ fC per particle and not more than $\pm 150 \times (r^2/10^2)$ fC per particle.

5. The image display medium as claimed in claim 1, wherein an additive is incorporated in the surfaces of the particles of at least one type of the particle groups, and the additive contains a titanium compound obtained by the reaction of $TiO(OH)_2$ and a silane compound.

6. The image display medium as claimed in claim 1, wherein at least one type of the particle groups has a magnetic property.

7. The image display medium as claimed in claim 1, further comprising:
    a cell structure composed of cells of a predetermined shape between the substrates.

8. The image display medium as claimed in claim 1, further comprising:
    a cell structure composed of cells of a predetermined shape between the substrates,
    wherein the particle groups are contained in the cells corresponding to respective plural colors forming a multicolor image.

9. The image display medium as claimed in claim 1, wherein matrix electrodes are formed on the pair of substrates.

10. The image display medium as claimed in claim 1, wherein a pixel electrode is formed on one of the pair of substrates, and an electrode is formed on the other substrate.

11. The image display medium as claimed in claim 1, wherein a photoconductive layer is formed on one of the pair of substrates.

12. The image display medium as claimed in claim 1, wherein a photoconductive layer is formed on one of the pair of substrates, and at least one type of the particle groups contains particles formed of a photoconductive material.

13. An image-forming method in which the image is formed on the image display medium as claimed in claim 1, the method comprising the steps of:
    forming on a latent image carrier an electrostatic latent image corresponding to an image; and
    generating an electric field between a counter electrode and the latent image carrier, the counter electrode being mounted in a position facing the latent image carrier such that the image display medium can be positioned therebetween.

14. An image-forming apparatus in which the image is formed on the image display medium as claimed in claim 1, the image-forming apparatus comprising:
    electric field-generating means for generating an electric field according to the image between the pair of substrates.

15. An image-forming apparatus for forming an image on an image display medium, comprising:
    the image display medium comprising a pair of substrates, plural types of particle groups contained between the substrates to be movable therebetween by an applied electric field, the plural types of particle groups being different in color and charging property, and a photoconductive layer being formed on one of the pair of substrates;

voltage-applying means for applying a voltage between the pair of substrates;

a transparent panel formed according to a pattern corresponding to the image; and a light source for irradiating the transparent panel with light.

16. An image-forming apparatus for forming an image on an image display medium, comprising:

the image display medium comprising a pair of substrates, and a space defined between them, with at least one of a gas disposed in the space and partial vacuum formed in the space, and plural types of particle groups contained between the substrates to be movable therebetween by an applied electric field, the plural types of the particle groups being different in color and charging property;

a latent image carrier;

electrostatic latent image forming means for forming on the latent image carrier an electrostatic latent image corresponding to an image; and a counter electrode for generating an electric field between itself and the latent image carrier, the counter electrode being mounted in a position facing the latent image carrier such that the image display medium can be positioned therebetween.

17. The image-forming apparatus as claimed in claim 16, wherein a bias voltage is applied to the counter electrode.

18. The image-forming apparatus as claimed in claim 16, further comprising:

inputting means for inputting whether a medium on which the image is formed is the image display medium or an image-recording medium;

developing means for developing the electrostatic latent image formed by the electrostatic latent image forming means with a toner when the result inputted by the inputting means is the image-recording medium;

transferring means for transferring the toner image developed by the developing means onto the image-recording medium; and fixing means for fixing the toner image transferred onto the image-recording medium.

19. The image-forming apparatus as claimed in claim 16, further comprising:

medium-detecting means for detecting whether a medium on which the image is formed is the image display medium or an image-recording medium;

developing means for developing the electrostatic latent image formed by the electrostatic latent image forming means with a toner when the result inputted by the inputting means is the image-recording medium;

transferring means for transferring the toner image developed by the developing means onto the image-recording medium; and fixing means for fixing the toner image transferred onto the image-recording medium.

20. The image-forming apparatus as claimed in claim 16, further comprising:

inputting means for inputting whether a medium on which the image is formed is the image display medium or an image-recording medium;

developing means for developing the electrostatic latent image formed by the electrostatic latent image forming means with a toner when the result inputted by the inputting means is the image-recording medium;

a counter electrode for transferring the toner image developed by the developing means onto the image-recording medium; and fixing means for fixing the toner image transferred onto the image-recording medium.

21. The image-forming apparatus as claimed in claim 16, further comprising:

inputting means for inputting whether a medium on which the image is formed is the image display medium or an image-recording medium;

developing means for developing the electrostatic latent image formed by the electrostatic latent image forming means with a toner when the result inputted by the inputting means is the image-recording medium;

a counter electrode for transferring the toner image developed by the developing means onto the image-recording medium; and fixing means for fixing the toner image transferred onto the image-recording medium, wherein the fixing by the fixing means is not conducted when the result inputted by the inputting means is the image display medium.

22. The image-forming apparatus as claimed in claim 16, further comprising:

inputting means for inputting whether a medium on which the image is formed is the image display medium or an image-recording medium;

developing means for developing the electrostatic latent image formed by the electrostatic latent image forming means with a toner when the result inputted by the inputting means is the image-recording medium;

a counter electrode for transferring the toner image developed by the developing means onto the image-recording medium;

fixing means for fixing the toner image transferred onto the image-recording medium; and development stopping means for stopping the development by the developing means when the result inputted by the inputting means is the image display medium.

23. The image-forming apparatus as claimed in claim 16, further comprising:

charging means for previously charging the particle groups.

24. The image-forming apparatus as claimed in claim 16, further comprising:

charging means for previously charging the particle groups by applying at least one of a DC voltage and an AC voltage to the substrates.

25. The image-forming apparatus as claimed in claim 16, further comprising:

vibrating means for vibrating the substrates as charging means for previously charging the particle groups.

26. The image-forming apparatus as claimed in claim 16, further comprising:

charging means for previously charging the particle groups by applying an alternating magnetic field to the image display medium, wherein at least one type of the particle groups has a magnetic property.

27. An image-forming method comprising the step of:

just before applying an electric field according to image information, applying an alternating electric field to plural types of particle groups contained between substrates in an image display medium to be movable therebetween by an applied electric field, the plural types of particle groups being different in color and charging property.

28. The image-forming method as claimed in claim 27, wherein the alternating electric field is applied to the whole surface of the image display medium simultaneously.

29. The image-forming method as claimed in claim 27, wherein the alternating field is applied, just before the electric field according to the image information is applied, according to a sequence for applying an electric field in a line unit.

30. The image-forming method as claimed in claim 27, wherein an amplitude of the alternating electric field is reduced with the lapse of time.

31. The image-forming method as claimed in claim 27, wherein a voltage waveform of the alternating electric field is rectangular.

32. An image display medium comprising:

a first member;

a second member mounted facing the first member;

first particles contained in a space formed between the first member and the second member, the first particles being moved toward the first member by an electric field applied between the first member and the second member; and second particles contained in the space, which are different in color from the first particles, the second particles being moved toward the second member by the electric field applied between the first member and the second member.

33. An image display medium comprising:

a first member;

a second member mounted facing the first member;

first particles contained in a space formed between the first member and the second member, the first particles being charged positively or negatively; and second particles contained in the space, which are different in color from the first particles, the second particles being charged opposite in polarity to that of the first particles.

34. An image display medium comprising:

a first member;

a second member mounted facing the first member;

first particles contained in a space formed between the first member and the second member, the first particles having an insulating property on at least the surfaces thereof and being charged positively; and second particles contained in the space, which are different in color from the first particles, the second particles having an insulating property on at least the surfaces thereof and being charged negatively.

35. An image display medium comprising:

a first member;

a second member mounted facing the first member;

first particles contained in a space formed between the first member and the second member, the first particles having an insulating property on at least the surfaces thereof; and second particles contained in the space, which are different in color from the first particles, the second particles having an electron-transporting property or a hole-transporting property on at least the surfaces thereof.

36. An image display medium comprising:

a first member having a conductivity;

a second member mounted facing the first member and having a hole-transporting property or an electron-transporting property;

first particles contained in a space formed between the first member and the second member, the first particles having an insulating property on at least the surfaces thereof and being charged positively or negatively; and second particles contained in the space, which are different in color from the first particles, the second particles having a conductivity on at least the surfaces thereof.

37. An image display medium comprising:

a first member having a hole-transporting property;

a second member mounted facing the first member and having an insulating property or a hole-transporting property;

first particles contained in a space formed between the first member and the second member, the first particles having a conductivity on at least the surfaces thereof; and second particles contained in the space, which are different in color from the first particles, the second particles having an insulating property on at least the surfaces thereof and being charged positively or negatively.

38. An image display medium comprising:

a first member having an electron-transporting property;

a second member mounted facing the first member and having an electron-transporting property;

first particles contained in a space formed between the first member and the second member, the first particles having a conductivity on at least the surfaces thereof; and second particles contained in the space, which are different in color from the first particles, the second particles having an insulating property on at least the surfaces thereof and being charged positively.

39. An image display medium comprising:

a first member having an insulating property or an electron-transporting property;

a second member mounted facing the first member and having an insulating property;

first particles contained in a space formed between the first member and the second member, the first particles having a conductivity on at least the surfaces thereof; and second particles contained in the space, which are different in color from the first particles, the second particles having an insulating property on at least the surfaces thereof and being charged positively or negatively.

40. An image display medium comprising:

a first member having an electron-transporting property;

a second member mounted facing the first member and having an electron-transporting property or an insulating property;

first particles contained in a space formed between the first member and the second member, the first particles having a hole-transporting property on at least the surfaces thereof and being charged positively; and second particles contained in the space, which are different in color from the first particles, the second particles having a hole-transporting property on at least the surfaces thereof and being charged negatively.

41. An image display medium comprising:

a first member having an insulating property;

a second member mounted facing the first member and having an insulating property;

first particles contained in a space formed between the first member and the second member, the first particles having a hole-transporting property on at least the surfaces thereof and being charged positively; and second particles contained in the space, which are different in color from the first particles, the second particles having a hole-transporting property on at least the surfaces thereof and being charged negatively.

42. An image display medium comprising:

a first member;

a second member mounted facing the first member;

first particles contained in a space formed between the first member and the second member, the first particles having a hole-transporting property on at least the surfaces thereof; and second particles contained in the space, which are different in color from the first particles, the second particles having an electron-transporting property on at least the surfaces thereof.

43. An image display medium comprising:

a first member having an electron-transporting property or an insulating property;

a second member mounted facing the first member and having an electron-transporting property or an insulating property;

first particles contained in a space formed between the first member and the second member, the first particles having a hole-transporting property on at least the surfaces thereof; and second particles contained in the space, which are different in color from the first particles, the second particles having a conductivity on at least the surfaces thereof.

44. An image display medium comprising:

a first member having a hole-transporting property;

a second member mounted facing the first member and having a hole-transporting property or an insulating property;

first particles contained in a space formed between the first member and the second member, the first particles having an electron-transporting property on at least the surfaces thereof and being charged positively; and second particles contained in the space, which are different in color from the first particles, the second particles having an electron-transporting property on at least the surfaces thereof and being charged negatively.

45. An image display medium comprising:

a first member having an insulating property;

a second member mounted facing the first member and having an insulating property;

first particles contained in a space formed between the first member and the second member, the first particles having an electron-transporting property on at least the surfaces thereof and being charged positively; and second particles contained in the space, which are different in color from the first particles, the second particles having an electron-transporting property on at least the surfaces thereof and being charged negatively.

46. An image display medium comprising:

a first member having a hole-transporting property or an insulating property;

a second member mounted facing the first member and having an insulating property or a hole-transporting property;

first particles contained in a space formed between the first member and the second member, the first particles having a conductivity on at least the surfaces thereof; and second particles contained in the space, which are different in color from the first particles, the second particles having an electron-transporting property on at least the surfaces thereof.

47. An image display medium comprising:

a first member having a conductivity;

a second member mounted facing the first member and having a conductivity or an insulating property;

first particles contained in a space formed between the first member and the second member, the first particles having a conductivity on at least the surfaces thereof; and second particles contained in the space, which are different in color from the first particles, the second particles having an insulating property on at least the surfaces thereof.

48. An image display medium comprising:

a first member having a hole-transporting property;

a second member mounted facing the first member and having an electron-transporting property;

first particles contained in a space formed between the first member and the second member, the first particles having a conductivity on at least the surfaces thereof; and second particles contained in the space, which are different in color from the first particles, the second particles having an insulating property on at least the surfaces thereof.

49. An image display medium comprising:

a first member having a conductivity;

a second member mounted facing the first member and having a hole-transporting property, a conductivity or an insulating property;

first particles contained in a space formed between the first member and the second member, the first particles having a conductivity on at least the surfaces thereof; and second particles contained in the space, which are different in color from the first particles, the second particles having a hole-transporting property on at least the surfaces thereof.

50. An image display medium comprising:

a first member having a hole-transporting property;

a second member mounted facing the first member and having an electron-transporting property;

first particles contained in a space formed between the first member and the second member, the first particles having a conductivity on at least the surfaces thereof; and second particles contained in the space, which are different in color from the first particles, the second particles having a hole-transporting property or an electron-transporting property on at least the surfaces thereof.

51. An image display medium comprising:

a first member having a conductivity;

a second member mounted facing the first member and having an electron-transporting property, a conductivity or an insulating property;

first particles contained in a space formed between the first member and the second member, the first particles having a conductivity on at least the surfaces thereof; and second particles contained in the space, which are different in color from the first particles, the second particles having an electron-transporting property on at least the surfaces thereof.

* * * * *